US012634969B2

(12) United States Patent
Kim et al.

(10) Patent No.: US 12,634,969 B2
(45) Date of Patent: May 19, 2026

(54) APPARATUS AND METHOD FOR SIGNAL TRANSMISSION IN WIRELESS COMMUNICATION SYSTEM

(71) Applicant: LG ELECTRONICS INC., Seoul (KR)

(72) Inventors: Yeong Jun Kim, Seoul (KR); Sangrim Lee, Seoul (KR); Hojae Lee, Seoul (KR); Ki Jun Jeon, Seoul (KR); Sungjin Kim, Seoul (KR); Tae Hyun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 428 days.

(21) Appl. No.: 18/034,324

(22) PCT Filed: Oct. 29, 2021

(86) PCT No.: PCT/KR2021/015462
§ 371 (c)(1),
(2) Date: Apr. 27, 2023

(87) PCT Pub. No.: WO2022/092905
PCT Pub. Date: May 5, 2022

(65) Prior Publication Data
US 2023/0379949 A1      Nov. 23, 2023

(30) Foreign Application Priority Data
Oct. 30, 2020    (KR) ........................ 10-2020-0143597

(51) Int. Cl.
| | |
|---|---|
| *H04W 72/50* | (2023.01) |
| *H04L 5/00* | (2006.01) |
| *H04W 24/02* | (2009.01) |

(52) U.S. Cl.
CPC ........... *H04W 72/50* (2023.01); *H04L 5/0048* (2013.01); *H04W 24/02* (2013.01)

(58) Field of Classification Search
CPC ..... H04W 72/50; H04W 72/20; H04W 24/02; H04W 52/14; H04L 5/0048; H04L 5/0051;
(Continued)

(56) References Cited

U.S. PATENT DOCUMENTS

| | | | |
|---|---|---|---|
| 2012/0250742 A1 | 10/2012 | Tiirola et al. | |
| 2022/0116764 A1* | 4/2022 | Pezeshki | ................ G06N 3/084 |

(Continued)

FOREIGN PATENT DOCUMENTS

| | | |
|---|---|---|
| WO | 2012064783 | 5/2012 |

OTHER PUBLICATIONS

Mingzhe, et al., "A Joint Learning and Communications Framework for Federated Learning over Wireless Networks", [online], Sep. 2019, https:researchgate.net/publication/335908231, 32 pages.

(Continued)

*Primary Examiner* — Candal Elpenord
(74) *Attorney, Agent, or Firm* — LEE, HONG, DEGERMAN, KANG & WAIMEY

(57)      ABSTRACT

The present disclosure a method of operating a user equipment (UE) in a wireless communication system, the method comprising: transmitting a reference signal to a base station by the UE; receiving a response message from the base station based on the reference signal by the UE; and transmitting a local parameter of a local model to the base station by the UE, wherein the response message comprises transmission mode information, resource allocation information and feedback information of the reference signal, and wherein the transmission mode information indicates a first transmission mode or a second transmission mode, the local (Continued)

parameter of the local parameter is transmitted based on the indicated first transmission mode or second transmission mode, and the local parameter of the local model is related to federated learning.

15 Claims, 26 Drawing Sheets

(58) Field of Classification Search
CPC . H04L 1/00; H04L 1/0025; H04L 1/04; H04L 25/02; H04L 25/03; H04L 27/26; H04L 67/10; H04B 7/06; G06N 3/98
USPC ................................................... 370/329–330
See application file for complete search history.

(56) References Cited

U.S. PATENT DOCUMENTS

| | | | | |
|---|---|---|---|---|
| 2022/0278728 A1* | 9/2022 | Vankayala | ............. | G06N 3/045 |
| 2023/0351205 A1* | 11/2023 | Moradi | .................. | G06N 3/098 |
| 2023/0385688 A1* | 11/2023 | Sun | ......................... | G06N 20/00 |
| 2023/0409962 A1* | 12/2023 | Butt | ......................... | G06N 20/00 |
| 2024/0022288 A1* | 1/2024 | Manolakos | .......... | H04B 7/0417 |
| 2024/0023091 A1* | 1/2024 | Li | ..................... | H04W 72/1268 |

OTHER PUBLICATIONS

Zhang, et al., "Deep-Reinforcement-Learning-Based Mode Selection and Resource Allocation for Cellular V2X Communications", IEEE Internet of Things Journal, Dec. 2019, vol. 7, Issue 7, pp. 6380-6391, 14 pages.

Bisaglia, et al., "Pre-equalization Techniques for Downlink and Uplink TDD MC-CDMA Systems", Wireless Personal Communications, vol. 35, pp. 3-18, Oct. 2005, 18 pages.

PCT International Application No. PCT/KR2021/0015462, International Search Report dated Feb. 2022, 5 pages.

* cited by examiner

Figure 3:
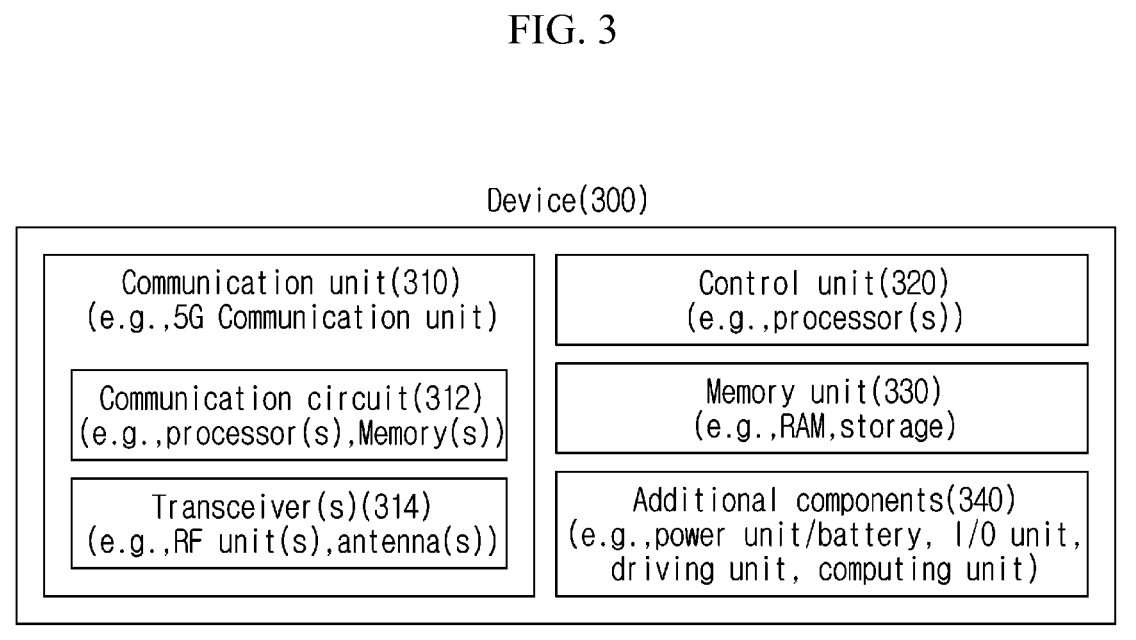

Device(300)

| Communication unit(310)<br>(e.g.,5G Communication unit) | Control unit(320)<br>(e.g.,processor(s)) |
|---|---|
| Communication circuit(312)<br>(e.g.,processor(s),Memory(s)) | Memory unit(330)<br>(e.g.,RAM,storage) |
| Transceiver(s)(314)<br>(e.g.,RF unit(s),antenna(s)) | Additional components(340)<br>(e.g.,power unit/battery, I/O unit,<br>driving unit, computing unit) |

BS
1804

Frequency
selection mode

Frequency
combining mode user
1802

Mode selection based on the
overhead and Tx power consumption

APPARATUS AND METHOD FOR SIGNAL TRANSMISSION IN WIRELESS COMMUNICATION SYSTEM

CROSS-REFERENCE TO RELATED APPLICATION(S)

This application is the National Stage filing under 35 U.S.C. 371 of International Application No. PCT/KR2021/015462, filed on Oct. 29, 2021, which claims the benefit of earlier filing date and right of priority to Korean Application No. 10-2020-0143597, filed on Oct. 30, 2020, the contents of which are all incorporated by reference herein in their entirety.

TECHNICAL FIELD

The following description relates to an apparatus and method for transmitting a signal in a wireless communication system.

BACKGROUND

Radio access systems have come into widespread in order to provide various types of communication services such as voice or data. In general, a radio access system is a multiple access system capable of supporting communication with multiple users by sharing available system resources (bandwidth, transmit power, etc.). Examples of the multiple access system include a code division multiple access (CDMA) system, a frequency division multiple access (FDMA) system, a time division multiple access (TDMA) system, a single carrier-frequency division multiple access (SC-FDMA) system, etc.

In particular, as many communication apparatuses require a large communication capacity, an enhanced mobile broadband (eMBB) communication technology has been proposed compared to radio access technology (RAT). In addition, not only massive machine type communications (MTC) for providing various services anytime anywhere by connecting a plurality of apparatuses and things but also communication systems considering services/user equipments (UEs) sensitive to reliability and latency have been proposed. To this end, various technical configurations have been proposed.

SUMMARY

The present disclosure may provide an apparatus and method for transmitting a signal in a wireless communication system.

The present disclosure may provide an apparatus and method for transmitting a signal for federated learning in a wireless communication system.

The technical objects to be achieved in the present disclosure are not limited to the above-mentioned technical objects, and other technical objects that are not mentioned may be considered by those skilled in the art through the embodiments described below.

The present disclosure a method of operating a user equipment (UE) in a wireless communication system, the method comprising: the UE transmitting a reference signal to a base station; the UE receiving a response message from the base station based on the reference signal; and the UE transmitting a local parameter of a local model to the base station, wherein the response message comprises transmission mode information, resource allocation information and feedback information of the reference signal, and wherein the transmission mode information indicates a first transmission mode or a second transmission mode, the local parameter of the local parameter is transmitted based on the indicated first transmission mode or second transmission mode, and the local parameter of the local model is related to federated learning.

The present disclosure a user equipment (UE) in a wireless communication system, comprising: a transceiver; and a processor connected to the transceiver, wherein the processor is configured to control the transceiver to: transmit a reference signal to a base station; receive a response message from the base station based on the reference signal; and transmit a local parameter of a local model to the base station, wherein the response message comprises transmission mode information, resource allocation information and feedback information of the reference signal, the transmission mode information indicates a first transmission mode or a second transmission mode, the local parameter of the local parameter is transmitted based on the indicated first transmission mode or second transmission mode, and the local parameter of the local model is related to federated learning.

The present disclosure a communication apparatus comprising: at least one processor; and at least one computer memory connected to the at least one processor and configured to store an instruction instructing operations as being executed by the at least one processor, wherein the processor is configured to control the communication apparatus to: transmit a reference signal to a base station, receive a response message from the base station based on the reference signal; and transmit a local parameter of a local model to the base station, wherein the response message comprises transmission mode information, resource allocation information and feedback information of the reference signal, the transmission mode information indicates a first transmission mode or a second transmission mode, the local parameter of the local parameter is transmitted based on the indicated first transmission mode or second transmission mode, and the local parameter of the local model is related to federated learning.

The present disclosure a non-transitory computer-readable medium storing at least one instruction, the computer-readable medium comprising the at least one instruction executable by a processor, wherein the at least one instruction instructs the computer-readable medium to: transmit a reference signal to a base station, receive a response message from the base station based on the reference signal; and transmit a local parameter of a local model to the base station, wherein the response message comprises transmission mode information, resource allocation information and feedback information of the reference signal, the transmission mode information indicates a first transmission mode or a second transmission mode, the local parameter of the local parameter is transmitted based on the indicated first transmission mode or second transmission mode, and the local parameter of the local model is related to federated learning.

The present disclosure a method of operating a base station in a wireless communication system, the method comprising: receiving a reference signal from a user equipment (UE); transmitting a response message to the UE based on the reference signal; and receiving a local parameter of a local model from the UE to the base station, wherein the response message comprises transmission mode information, resource allocation information and feedback information of the reference signal, the transmission mode information indicates a first transmission mode or a second transmission mode, the local parameter of the local parameter is transmitted based on the indicated first transmission mode or second transmission mode, and the local parameter of the local model is related to federated learning.

The present disclosure a base station in a wireless communication system, comprising: a transceiver; and a processor connected to the transceiver, wherein the processor is configured to control the transceiver to: receive a reference signal from a user equipment (UE); transmit a response message to the UE based on the reference signal; and receive a local parameter of a local model from the UE to the base station, wherein the response message comprises transmission mode information, resource allocation information and feedback information of the reference signal, the transmission mode information indicates a first transmission mode or a second transmission mode, the local parameter of the local parameter is transmitted based on the indicated first transmission mode or second transmission mode, and the local parameter of the local model is related to federated learning.

The technical objects of the present disclosure are not limited to the above-mentioned technical objects, and other unmentioned technical objects will become apparent to those skilled in the art from the following description.

The following effects may be obtained by embodiments based on the present disclosure.

According to the present disclosure, a base station and a terminal (user equipment (UE)) may perform federated learning, thereby reducing overhead when data is transmitted.

According to the present disclosure, loss of a terminal (UE) transmission signal may be reduced.

Effects obtained in the present disclosure are not limited to the above-mentioned effects, and other effects not mentioned above may be clearly derived and understood by those skilled in the art, to which a technical configuration of the present disclosure is applied, from the following description of embodiments of the present disclosure. That is, effects, which are not intended when implementing a configuration described in the present disclosure, may also be derived by those skilled in the art from the embodiments of the present disclosure.

DESCRIPTION OF DRAWINGS

The accompanying drawings are provided to help understanding of the present disclosure, and may provide embodiments of the present disclosure together with a detailed description. However, the technical features of the present disclosure are not limited to specific drawings, and the features disclosed in each drawing may be combined with each other to constitute a new embodiment. Reference numerals in each drawing may refer to structural elements.

FIG. 2 is a view showing an example of a wireless device applicable to the present disclosure.

FIG. 3 is a view showing another example of a wireless device applicable to the present disclosure.

DETAILED DESCRIPTION

Figure 1:
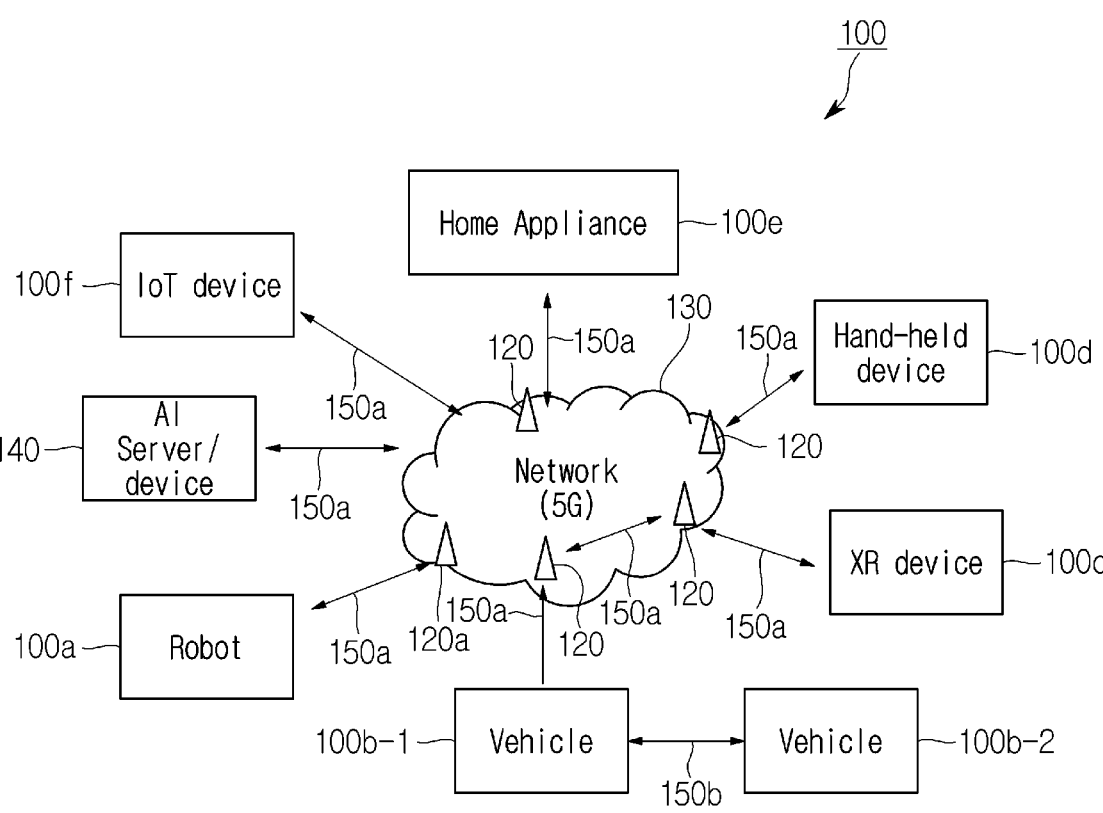
FIG. 1 is a view showing an example of a communication system applicable to the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the drawings, procedures or steps which render the scope of the present disclosure unnecessarily ambiguous will be omitted and procedures or steps which can be understood by those skilled in the art will be omitted.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a base station (BS) and a mobile station. A BS refers to a terminal node of a network, which directly communicates with a mobile station. A specific operation described as being performed by the BS may be performed by an upper node of the BS.

Namely, it is apparent that, in a network comprised of a plurality of network nodes including a BS, various operations performed for communication with a mobile station may be performed by the BS, or network nodes other than the BS. The term "BS" may be replaced with a fixed station, a Node B, an evolved Node B (eNode B or eNB), an advanced base station (ABS), an access point, etc.

In the embodiments of the present disclosure, the term terminal may be replaced with a UE, a mobile station (MS), a subscriber station (SS), a mobile subscriber station (MSS), a mobile terminal, an advanced mobile station (AMS), etc.

A transmitter is a fixed and/or mobile node that provides a data service or a voice service and a receiver is a fixed and/or mobile node that receives a data service or a voice service. Therefore, a mobile station may serve as a transmitter and a BS may serve as a receiver, on an uplink (UL). Likewise, the mobile station may serve as a receiver and the BS may serve as a transmitter, on a downlink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5th generation (5G) new radio (NR) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331.

In addition, the embodiments of the present disclosure are applicable to other radio access systems and are not limited to the above-described system. For example, the embodiments of the present disclosure are applicable to systems applied after a 3GPP 5G NR system and are not limited to a specific system.

That is, steps or parts that are not described to clarify the technical features of the present disclosure may be supported by those documents. Further, all terms as set forth herein may be explained by the standard documents.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

The embodiments of the present disclosure can be applied to various radio access systems such as code division multiple access (CDMA), frequency division multiple access (FDMA), time division multiple access (TDMA), orthogonal frequency division multiple access (OFDMA), single carrier frequency division multiple access (SC-FDMA), etc.

Hereinafter, in order to clarify the following description, a description is made based on a 3GPP communication system (e.g., LTE, NR, etc.), but the technical spirit of the present disclosure is not limited thereto. LTE may refer to technology after 3GPP TS 36.xxx Release 8. In detail, LTE technology after 3GPP TS 36.xxx Release 10 may be referred to as LTE-A, and LTE technology after 3GPP TS 36.xxx Release 13 may be referred to as LTE-A pro. 3GPP NR may refer to technology after TS 38.xxx Release 15. 3GPP 6G may refer to technology TS Release 17 and/or Release 18. "xxx" may refer to a detailed number of a standard document. LTE/NR/6G may be collectively referred to as a 3GPP system.

For background arts, terms, abbreviations, etc. used in the present disclosure, refer to matters described in the standard documents published prior to the present disclosure. For example, reference may be made to the standard documents 36.xxx and 38.xxx.

Communication System Applicable to the Present Disclosure

Without being limited thereto, various descriptions, functions, procedures, proposals, methods and/or operational flowcharts of the present disclosure disclosed herein are applicable to various fields requiring wireless communication/connection (e.g., 5G).

Hereinafter, a more detailed description will be given with reference to the drawings. In the following drawings/description, the same reference numerals may exemplify the same or corresponding hardware blocks, software blocks or functional blocks unless indicated otherwise.

FIG. 1 is a view showing an example of a communication system applicable to the present disclosure.

Referring to FIG. 1, the communication system 100 applicable to the present disclosure includes a wireless device, a base station and a network. The wireless device refers to a device for performing communication using radio access technology (e.g., 5G NR or LTE) and may be referred to as a communication/wireless/5G device. Without being limited thereto, the wireless device may include a robot 100a, vehicles 100b-1 and 100b-2, an extended reality (XR) device 100c, a hand-held device 100d, a home appliance 100e, an Internet of Thing (IoT) device 100f, and an artificial intelligence (AI) device/server 100g. For example, the vehicles may include a vehicle having a wireless communication function, an autonomous vehicle, a vehicle capable of performing vehicle-to-vehicle communication, etc. The vehicles 100b-1 and 100b-2 may include an unmanned aerial vehicle (UAV) (e.g., a drone). The XR device 100c includes an augmented reality (AR)/virtual reality (VR)/mixed reality (MR) device and may be implemented in the form of a head-mounted device (HMD), a head-up display (HUD) provided in a vehicle, a television, a smartphone, a computer, a wearable device, a home appliance, a digital signage, a vehicle or a robot. The hand-held device 100d may include a smartphone, a smart pad, a wearable device (e.g., a smart watch or smart glasses), a computer (e.g., a laptop), etc. The home appliance 100e may include a TV, a refrigerator, a washing machine, etc. The IoT device 100f may include a sensor, a smart meter, etc. For example, the base station 120 and the network 130 may be implemented by a wireless device, and a specific wireless device 120a may operate as a base station/network node for another wireless device.

The wireless devices 100a to 100f may be connected to the network 130 through the base station 120. AI technology is applicable to the wireless devices 100a to 100f, and the wireless devices 100a to 100f may be connected to the AI server 100g through the network 130. The network 130 may be configured using a 3G network, a 4G (e.g., LTE) network or a 5G (e.g., NR) network, etc. The wireless devices 100a to 100f may communicate with each other through the base station 120/the network 130 or perform direct communication (e.g., sidelink communication) without through the base station 120/the network 130. For example, the vehicles 100b-1 and 100b-2 may perform direct communication (e.g., vehicle to vehicle (V2V)/vehicle to everything (V2X) communication). In addition, the IoT device 100f (e.g., a sensor) may perform direct communication with another IoT device (e.g., a sensor) or the other wireless devices 100a to 100f.

Wireless communications/connections 150a, 150b and 150c may be established between the wireless devices 100a to 100f/the base station 120 and the base station 120/the base station 120. Here, wireless communication/connection may be established through various radio access technologies (e.g., 5G NR) such as uplink/downlink communication 150a, sidelink communication 150b (or D2D communication) or communication 150c between base stations (e.g., relay, integrated access backhaul (IAB). The wireless device and the base station/wireless device or the base station and the base station may transmit/receive radio signals to/from each other through wireless communication/connection 150a, 150b and 150c. For example, wireless communication/connection 150a, 150b and 150c may enable signal transmission/reception through various physical channels. To this end, based on the various proposals of the present disclosure, at least some of various configuration information setting processes for transmission/reception of radio signals, various signal processing procedures (e.g., channel encoding/decoding, modulation/demodulation, resource mapping/demapping, etc.), resource allocation processes, etc. may be performed.

Communication System Applicable to the Present Disclosure

Figure 2:
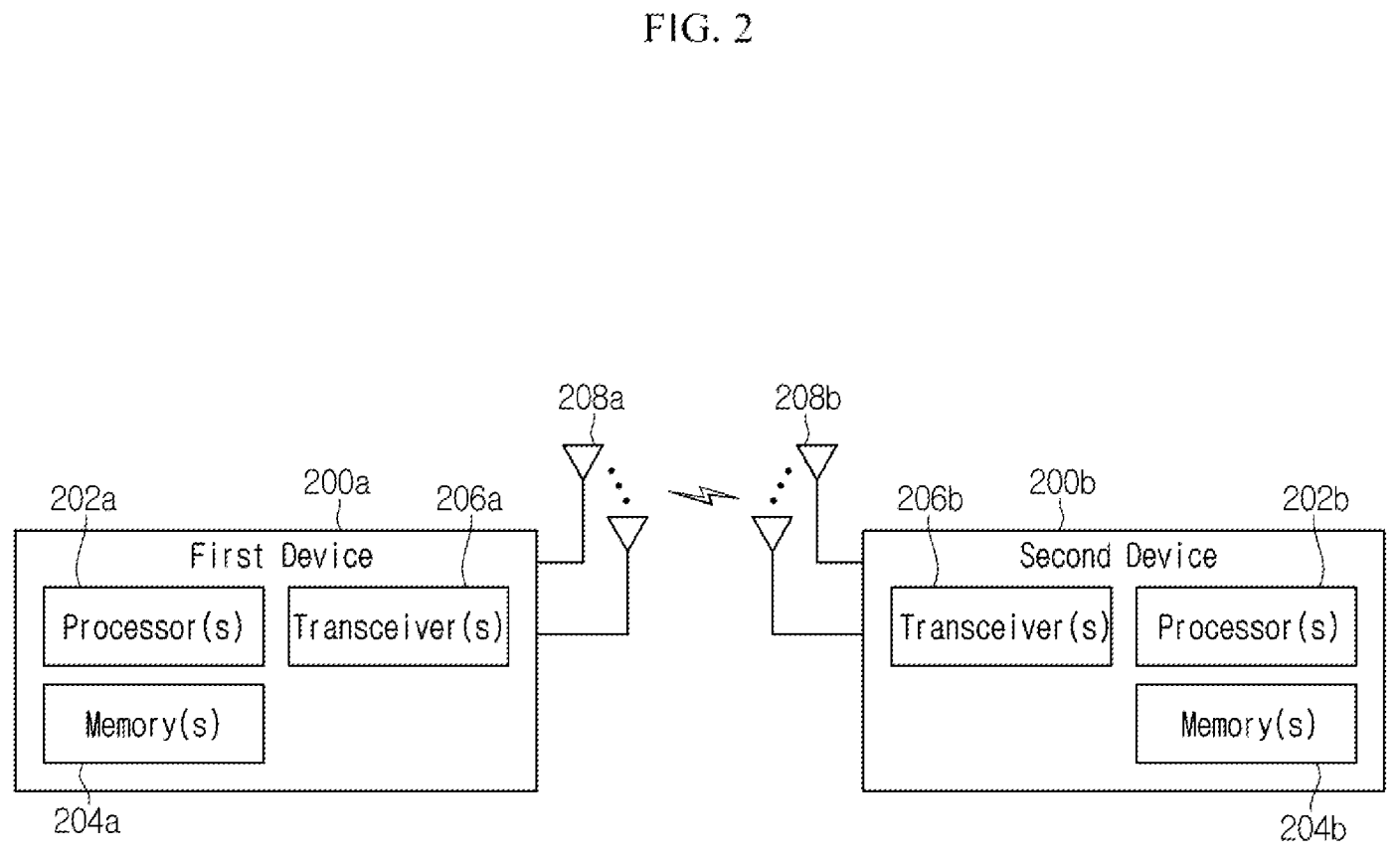

FIG. 2 is a view showing an example of a wireless device applicable to the present disclosure.

Referring to FIG. 2, a first wireless device 200a and a second wireless device 200b may transmit and receive radio signals through various radio access technologies (e.g., LTE or NR). Here, {the first wireless device 200a, the second wireless device 200b} may correspond to {the wireless device 100x, the base station 120} and/or {the wireless device 100x, the wireless device 100x} of FIG. 1.

The first wireless device 200a may include one or more processors 202a and one or more memories 204a and may further include one or more transceivers 206a and/or one or more antennas 208a. The processor 202a may be configured to control the memory 204a and/or the transceiver 206a and to implement descriptions, functions, procedures, proposals, methods and/or operational flowcharts disclosed herein. For example, the processor 202a may process information in the memory 204a to generate first information/signal and then transmit a radio signal including the first information/signal through the transceiver 206a. In addition, the processor 202a may receive a radio signal including second information/signal through the transceiver 206a and then store information obtained from signal processing of the second information/signal in the memory 204a. The memory 204a may be coupled with the processor 202a, and store a variety of information related to operation of the processor 202a. For example, the memory 204a may store software code including instructions for performing all or some of the processes controlled by the processor 202a or performing the descriptions, functions, procedures, proposals, methods and/or operational flowcharts disclosed herein. Here, the processor 202a and the memory 204a may be part of a communication modem/circuit/chip designed to implement wireless communication technology (e.g., LTE or NR). The transceiver 206a may be coupled with the processor 202a to transmit and/or receive radio signals through one or more antennas 208a. The transceiver 206a may include a transmitter and/or a receiver. The transceiver 206a may be used interchangeably with a radio frequency (RF) unit. In the present disclosure, the wireless device may refer to a communication modem/circuit/chip.

The second wireless device 200b may include one or more processors 202b and one or more memories 204b and may further include one or more transceivers 206b and/or one or more antennas 208b. The processor 202b may be configured to control the memory 204b and/or the transceiver 206b and to implement the descriptions, functions, procedures, proposals, methods and/or operational flowcharts disclosed herein. For example, the processor 202b may process information in the memory 204b to generate third information/signal and then transmit the third information/signal through the transceiver 206b. In addition, the processor 202b may receive a radio signal including fourth information/signal through the transceiver 206b and then store information obtained from signal processing of the fourth information/signal in the memory 204b. The memory 204b may be coupled with the processor 202b to store a variety of information related to operation of the processor 202b. For example, the memory 204b may store software code including instructions for performing all or some of the processes controlled by the processor 202b or performing the descriptions, functions, procedures, proposals, methods and/or operational flowcharts disclosed herein. Herein, the processor 202b and the memory 204b may be part of a communication modem/circuit/chip designed to implement wireless communication technology (e.g., LTE or NR). The transceiver 206b may be coupled with the processor 202b to transmit and/or receive radio signals through one or more antennas 208b. The transceiver 206b may include a transmitter and/or a receiver. The transceiver 206b may be used interchangeably with a radio frequency (RF) unit. In the present disclosure, the wireless device may refer to a communication modem/circuit/chip.

Hereinafter, hardware elements of the wireless devices 200a and 200b will be described in greater detail. Without being limited thereto, one or more protocol layers may be implemented by one or more processors 202a and 202b. For example, one or more processors 202a and 202b may implement one or more layers (e.g., functional layers such as PHY (physical), MAC (media access control), RLC (radio link control), PDCP (packet data convergence protocol), RRC (radio resource control), SDAP (service data adaptation protocol)). One or more processors 202a and 202b may generate one or more protocol data units (PDUs) and/or one or more service data unit (SDU) according to the descriptions, functions, procedures, proposals, methods and/or operational flowcharts disclosed herein. One or more processors 202a and 202b may generate messages, control information, data or information according to the descriptions, functions, procedures, proposals, methods and/or operational flowcharts disclosed herein. One or more processors 202a and 202b may generate PDUs, SDUs, messages, control information, data or information according to the functions, procedures, proposals and/or methods disclosed herein and provide the PDUs, SDUs, messages, control information, data or information to one or more transceivers 206a and 206b. One or more processors 202a and 202b may receive signals (e.g., baseband signals) from one or more transceivers 206a and 206b and acquire PDUs, SDUs, messages, control information, data or information according to the descriptions, functions, procedures, proposals, methods and/or operational flowcharts disclosed herein.

One or more processors 202a and 202b may be referred to as controllers, microcontrollers, microprocessors or microcomputers. One or more processors 202a and 202b may be implemented by hardware, firmware, software or a combination thereof. For example, one or more application specific integrated circuits (ASICs), one or more digital signal processors (DSPs), one or more digital signal processing devices (DSPDs), programmable logic devices (PLDs) or one or more field programmable gate arrays (FPGAs) may be included in one or more processors 202a and 202b. The descriptions, functions, procedures, proposals, methods and/or operational flowcharts disclosed herein may be implemented using firmware or software, and firmware or software may be implemented to include modules, procedures, functions, etc. Firmware or software configured to perform the descriptions, functions, procedures, proposals, methods and/or operational flowcharts disclosed herein may be included in one or more processors 202a and 202b or stored in one or more memories 204a and 204b to be driven by one or more processors 202a and 202b. The descriptions, functions, procedures, proposals, methods and/or operational flowcharts disclosed herein implemented using firmware or software in the form of code, a command and/or a set of commands.

One or more memories 204a and 204b may be coupled with one or more processors 202a and 202b to store various types of data, signals, messages, information, programs, code, instructions and/or commands. One or more memories 204a and 204b may be composed of read only memories (ROMs), random access memories (RAMs), erasable programmable read only memories (EPROMs), flash memories, hard drives, registers, cache memories, computer-readable storage mediums and/or combinations thereof. One or more memories 204a and 204b may be located inside and/or outside one or more processors 202a and 202b. In addition, one or more memories 204a and 204b may be coupled with one or more processors 202a and 202b through various technologies such as wired or wireless connection.

One or more transceivers 206a and 206b may transmit user data, control information, radio signals/channels, etc. described in the methods and/or operational flowcharts of the present disclosure to one or more other apparatuses. One or more transceivers 206a and 206b may receive user data, control information, radio signals/channels, etc. described in the methods and/or operational flowcharts of the present disclosure from one or more other apparatuses. For example, one or more transceivers 206a and 206b may be coupled with one or more processors 202a and 202b to transmit/receive radio signals. For example, one or more processors 202a and 202b may perform control such that one or more transceivers 206a and 206b transmit user data, control information or radio signals to one or more other apparatuses. In addition, one or more processors 202a and 202b may perform control such that one or more transceivers 206a and 206b receive user data, control information or radio signals from one or more other apparatuses. In addition, one or more transceivers 206a and 206b may be coupled with one or more antennas 208a and 208b, and one or more transceivers 206a and 206b may be configured to transmit/receive user data, control information, radio signals/channels, etc. described in the descriptions, functions, procedures, proposals, methods and/or operational flowcharts disclosed herein through one or more antennas 208a and 208b. In the present disclosure, one or more antennas may be a plurality of physical antennas or a plurality of logical antennas (e.g., antenna ports). One or more transceivers 206a and 206b may convert the received radio signals/channels, etc. from RF band signals to baseband signals, in order to process the received user data, control information, radio signals/channels, etc. using one or more processors 202a and 202b. One or more transceivers 206a and 206b may convert the user data, control information, radio signals/channels processed using one or more processors 202a and 202b from baseband signals into RF band signals. To this end, one or more transceivers 206a and 206b may include (analog) oscillator and/or filters.

Structure of Wireless Device Applicable to the Present Disclosure

FIG. 3 is a view showing another example of a wireless device applicable to the present disclosure.

Referring to FIG. 3, a wireless device 300 may correspond to the wireless devices 200a and 200b of FIG. 2 and include various elements, components, units/portions and/or modules. For example, the wireless device 300 may include a communication unit 310, a control unit (controller) 320, a memory unit (memory) 330 and additional components 340. The communication unit may include a communication circuit 312 and a transceiver(s) 314. For example, the communication circuit 312 may include one or more processors 202a and 202b and/or one or more memories 204a and 204b of FIG. 2. For example, the transceiver(s) 314 may include one or more transceivers 206a and 206b and/or one or more antennas 208a and 208b of FIG. 2. The control unit 320 may be electrically coupled with the communication unit 310, the memory unit 330 and the additional components 340 to control overall operation of the wireless device. For example, the control unit 320 may control electrical/mechanical operation of the wireless device based on a program/code/instruction/information stored in the memory unit 330. In addition, the control unit 320 may transmit the information stored in the memory unit 330 to the outside (e.g., another communication device) through the wireless/wired interface using the communication unit 310 over a wireless/wired interface or store information received from the outside (e.g., another communication device) through the wireless/wired interface using the communication unit 310 in the memory unit 330.

The additional components 340 may be variously configured according to the types of the wireless devices. For example, the additional components 340 may include at least one of a power unit/battery, an input/output unit, a driving unit or a computing unit. Without being limited thereto, the wireless device 300 may be implemented in the form of the robot (FIG. 1, 100a), the vehicles (FIGS. 1, 100b-1 and 100b-2), the XR device (FIG. 1, 100c), the hand-held device (FIG. 1, 100d), the home appliance (FIG. 1, 100e), the IoT device (FIG. 1, 100f), a digital broadcast terminal, a hologram apparatus, a public safety apparatus, an MTC apparatus, a medical apparatus, a Fintech device (financial device), a security device, a climate/environment device, an AI server/device (FIG. 1, 140), the base station (FIG. 1, 120), a network node, etc. The wireless device may be movable or may be used at a fixed place according to use example/service.

In FIG. 3, various elements, components, units/portions and/or modules in the wireless device 300 may be coupled with each other through wired interfaces or at least some thereof may be wirelessly coupled through the communication unit 310. For example, in the wireless device 300, the control unit 320 and the communication unit 310 may be coupled by wire, and the control unit 320 and the first unit (e.g., 130 or 140) may be wirelessly coupled through the communication unit 310. In addition, each element, component, unit/portion and/or module of the wireless device 300 may further include one or more elements. For example, the control unit 320 may be composed of a set of one or more processors. For example, the control unit 320 may be composed of a set of a communication control processor, an application processor, an electronic control unit (ECU), a graphic processing processor, a memory control processor, etc. In another example, the memory unit 330 may be composed of a random access memory (RAM), a dynamic RAM (DRAM), a read only memory (ROM), a flash memory, a volatile memory, a non-volatile memory and/or a combination thereof Hand-Held Device Applicable to the Present Disclosure FIG. 4 is a view showing an example of a hand-held device applicable to the present disclosure.

Figure 4:
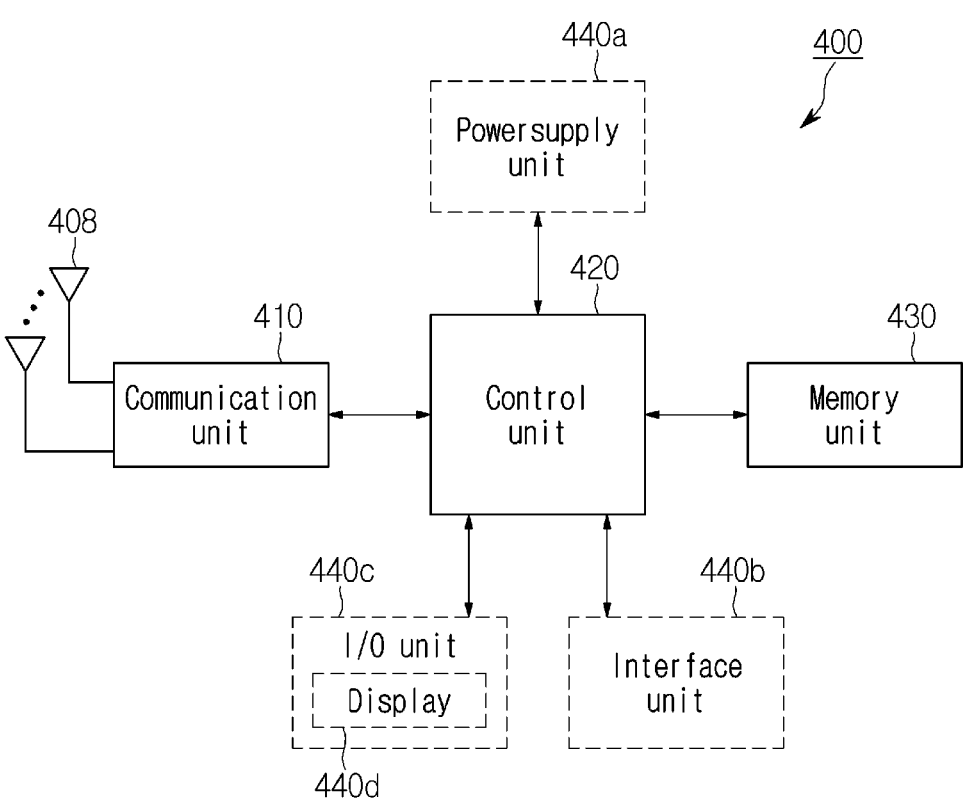
FIG. 4 is a view showing an example of a hand-held device applicable to the present disclosure.

FIG. 4 shows a hand-held device applicable to the present disclosure. The hand-held device may include a smartphone, a smart pad, a wearable device (e.g., a smart watch or smart glasses), and a hand-held computer (e.g., a laptop, etc.). The hand-held device may be referred to as a mobile station (MS), a user terminal (UT), a mobile subscriber station (MSS), a subscriber station (SS), an advanced mobile station (AMS) or a wireless terminal (WT).

Referring to FIG. 4, the hand-held device 400 may include an antenna unit (antenna) 408, a communication unit (transceiver) 410, a control unit (controller) 420, a memory unit (memory) 430, a power supply unit (power supply) 440a, an interface unit (interface) 440b, and an input/output unit 440c. An antenna unit (antenna) 408 may be part of the communication unit 410. The blocks 410 to 430/440a to 440c may correspond to the blocks 310 to 330/340 of FIG. 3, respectively.

The communication unit 410 may transmit and receive signals (e.g., data, control signals, etc.) to and from other wireless devices or base stations. The control unit 420 may control the components of the hand-held device 400 to perform various operations. The control unit 420 may include an application processor (AP). The memory unit 430 may store data/parameters/program/code/instructions necessary to drive the hand-held device 400. In addition, the memory unit 430 may store input/output data/information, etc. The power supply unit 440a may supply power to the hand-held device 400 and include a wired/wireless charging circuit, a battery, etc. The interface unit 440b may support connection between the hand-held device 400 and another external device. The interface unit 440b may include various ports (e.g., an audio input/output port and a video input/output port) for connection with the external device. The input/output unit 440c may receive or output video information/signals, audio information/signals, data and/or user input information. The input/output unit 440c may include a camera, a microphone, a user input unit, a display 440d, a speaker and/or a haptic module.

For example, in case of data communication, the input/output unit 440c may acquire user input information/signal (e.g., touch, text, voice, image or video) from the user and store the user input information/signal in the memory unit 430. The communication unit 410 may convert the information/signal stored in the memory into a radio signal and transmit the converted radio signal to another wireless device directly or transmit the converted radio signal to a base station. In addition, the communication unit 410 may receive a radio signal from another wireless device or the base station and then restore the received radio signal into original information/signal. The restored information/signal may be stored in the memory unit 430 and then output through the input/output unit 440c in various forms (e.g., text, voice, image, video and haptic).

Type of Wireless Device Applicable to the Present Disclosure

Figure 5:
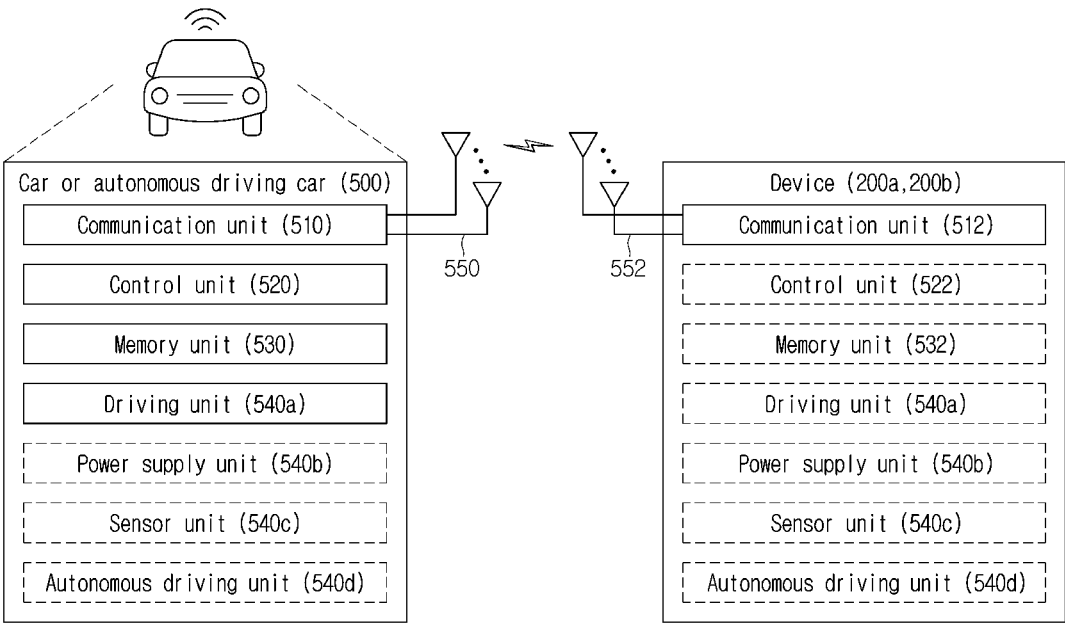
FIG. 5 is a view showing an example of a car or an autonomous driving car applicable to the present disclosure.

FIG. 5 is a view showing an example of a car or an autonomous driving car applicable to the present disclosure.

FIG. 5 shows a car or an autonomous driving vehicle applicable to the present disclosure. The car or the autonomous driving car may be implemented as a mobile robot, a vehicle, a train, a manned/unmanned aerial vehicle (AV), a ship, etc. and the type of the car is not limited.

Referring to FIG. 5, the car or autonomous driving car 500 may include an antenna unit (antenna) 508, a communication unit (transceiver) 510, a control unit (controller) 520, a driving unit 540a, a power supply unit (power supply) 540b, a sensor unit 540c, and an autonomous driving unit 540d. The antenna unit 550 may be configured as part of the communication unit 510. The blocks 510/530/540a to 540d correspond to the blocks 410/430/440 of FIG. 4.

The communication unit 510 may transmit and receive signals (e.g., data, control signals, etc.) to and from external devices such as another vehicle, a base station (e.g., a base station, a road side unit, etc.), and a server. The control unit 520 may control the elements of the car or autonomous driving car 500 to perform various operations. The control unit 520 may include an electronic control unit (ECU).

Figure 6:
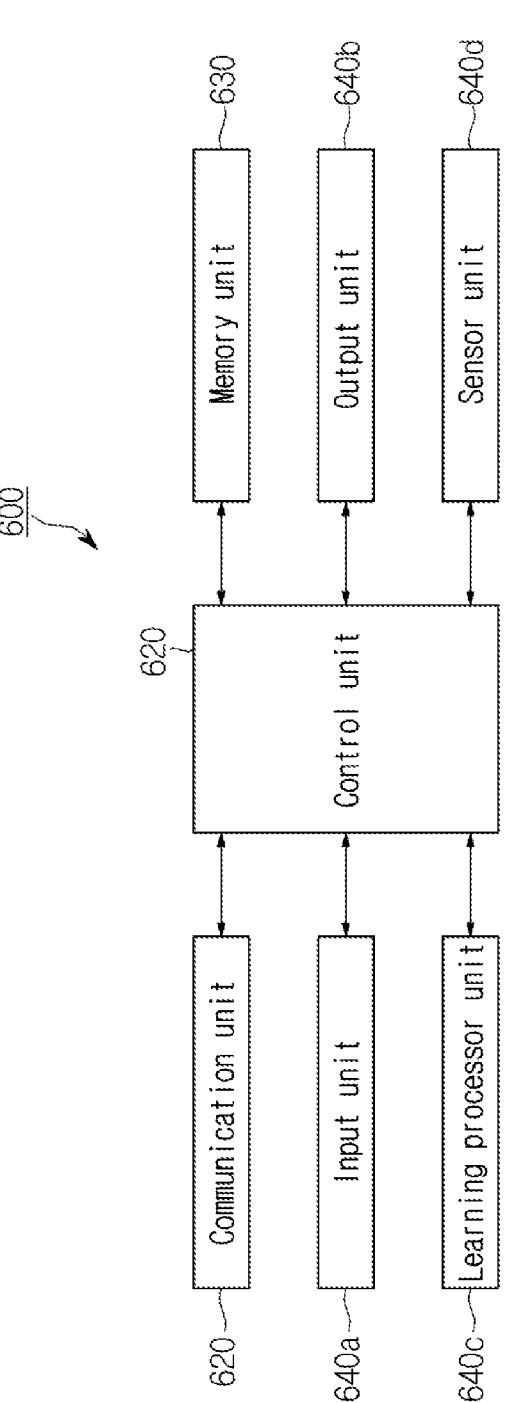
FIG. 6 is a diagram illustrating an example of an AI device applied to the present disclosure.

FIG. 6 is a diagram illustrating an example of an AI device applied to the present disclosure. For example, the AI device may be implemented as a fixed device or a movable device such as TV, projector, smartphone, PC, laptop, digital broadcasting terminal, tablet PC, wearable device, set-top box (STB), radio, washing machine, refrigerator, digital signage, robot, vehicle, etc.

Referring to FIG. 6, the AI device 600 may include a communication unit 610, a control unit 620, a memory unit 630, an input/output unit 640a/640b, a learning processor unit 640c and a sensor unit 640d. Blocks 610 to 630/640A to 640D may correspond to blocks 310 to 330/340 of FIG. 3, respectively.

The communication unit 610 may transmit and receive a wired and wireless signal (e.g., sensor information, user input, learning model, control signal, etc.) to and from external devices such as another AI device (e.g., 100x, 120, 140 in FIG. 1) or an AI server (140 in FIG. 1) using wired/wireless communication technology. To this end, the communication unit 610 may transmit information in the memory unit 630 to an external device or send a signal received from an external device to the memory unit 630.

The control unit 620 may determine at least one executable operation of the AI device 600 based on information determined or generated using a data analysis algorithm or machine learning algorithm. In addition, the control unit 620 may control the components of the AI device 600 to perform the determined operation. For example, the control unit 620 may request, search, receive, or utilize the data of the learning processor 640c or the memory unit 630, and control the components of the AI device 600 to perform predicted operation or operation determined to be preferred among at least one executable operation. In addition, the control unit 620 collects history information including a user's feedback on the operation content or operation of the AI device 600, and stores it in the memory unit 630 or the learning processor 640c or transmit it to an external device such as the AI server (140 in FIG. 1). The collected history information may be used to update a learning model.

The memory unit 630 may store data supporting various functions of the AI device 600. For example, the memory unit 630 may store data obtained from the input unit 640a, data obtained from the communication unit 610, output data of the learning processor unit 640c, and data obtained from the sensor unit 640. Also, the memory unit 630 may store control information and/or software code required for operation/execution of the control unit 620.

The input unit 640a may obtain various types of data from the outside of the AI device 600. For example, the input unit 620 may obtain learning data for model learning, input data to which the learning model is applied, etc. The input unit 640a may include a camera, a microphone and/or a user input unit, etc. The output unit 640b may generate audio, video or tactile output. The output unit 640b may include a display unit, a speaker and/or a haptic module. The sensor unit 640 may obtain at least one of internal information of the AI device 600, surrounding environment information of the AI device 600 or user information using various sensors. The sensor unit 640 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, and/or a radar.

The learning processor unit 640c may train a model composed of an artificial neural network using learning data. The learning processor unit 640c may perform AI processing together with the learning processor unit of the AI server (140 in FIG. 1). The learning processor unit 640c may process information received from an external device through the communication unit 610 and/or information stored in the memory unit 630. In addition, the output value of the learning processor unit 640c may be transmitted to an external device through the communication unit 610 and/or stored in the memory unit 630.

Figure 7:
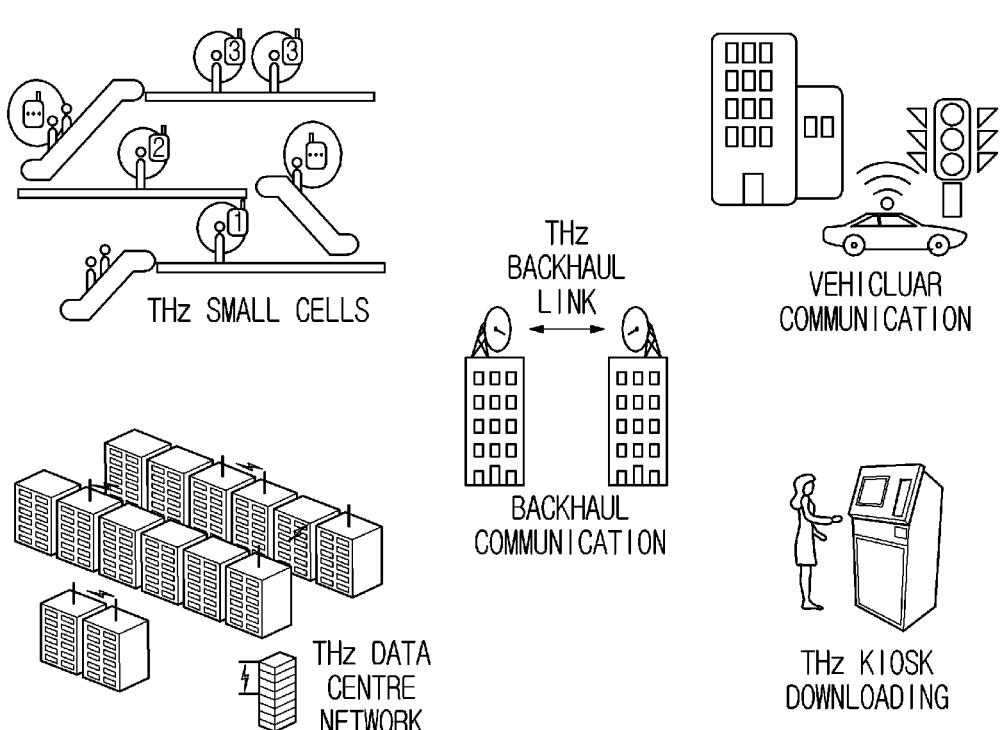
FIG. 7 is a diagram illustrating a method of processing a transmitted signal applied to the present disclosure.

FIG. 7 is a diagram illustrating a method of processing a transmitted signal applied to the present disclosure. For example, the transmitted signal may be processed by a signal processing circuit. In this case, the signal processing circuit 700 may include a scrambler 710, a modulator 720, a layer mapper 730, a precoder 740, a resource mapper 750, and a signal generator 760. At this time, as an example, the operation/function of FIG. 7 may be performed by the processors 202a and 202b and/or the transceivers 206a and 206b of FIG. 2. Also, as an example, the hardware elements of FIG. 7 may be implemented in the processors 202a and 202b and/or the transceivers 206a and 206b of FIG. 2. As an example, blocks 710 to 760 may be implemented in the processors 202a and 202b of FIG. 2. Also, blocks 710 to 750 may be implemented in the processors 202a and 202b of FIG. 2, and block 760 may be implemented in the transceivers 206a and 206b of FIG. 2, and are not limited to the above-described embodiment.

A codeword may be converted into a radio signal through the signal processing circuit 700 of FIG. 7. Here, the codeword is an encoded bit sequence of an information block. Information blocks may include transport blocks (e.g., UL-SCH transport blocks, DL-SCH transport blocks). The radio signal may be transmitted through various physical channels (e.g., PUSCH, PDSCH). Specifically, the codeword may be converted into a scrambled bit sequence by the scrambler 710. A scramble sequence used for scrambling is generated based on an initialization value, and the initialization value may include ID information of a wireless device. The scrambled bit sequence may be modulated into a modulation symbol sequence by the modulator 720. The modulation method may include pi/2-binary phase shift keying (pi/2-BPSK), m-phase shift keying (m-PSK), m-quadrature amplitude modulation (m-QAM), and the like.

A complex modulation symbol sequence may be mapped to one or more transport layers by the layer mapper 730. Modulation symbols of each transport layer may be mapped to corresponding antenna port(s) by the precoder 740 (precoding). The output z of the precoder 740 may be obtained by multiplying the output y of the layer mapper 730 by a N*M precoding matrix W. Here, N is the number of antenna ports and M is the number of transport layers. Here, the precoder 740 may perform precoding after transform precoding (e.g., discrete Fourier transform (DFT)) on complex modulation symbols. Also, the precoder 740 may perform precoding without performing transform precoding.

The resource mapper 750 may map modulation symbols of each antenna port to time-frequency resources. The time-frequency resources may include a plurality of symbols (e.g., CP-OFDMA symbols and DFT-s-OFDMA symbols) in the time domain and may include a plurality of subcarriers in the frequency domain. The signal generator 760 generates a radio signal from the mapped modulation symbols, and the generated radio signal may be transmitted to other devices through each antenna. To this end, the signal generator 760 may include an inverse fast Fourier transform (IFFT) module, a cyclic prefix (CP) inserter, a digital-to-analog converter (DAC), a frequency uplink converter, and the like.

A signal processing process for a received signal in a wireless device may be configured as the reverse of the signal processing processes 710 to 760 of FIG. 7. For example, a wireless device (e.g., 200a and 200b of FIG. 2) may receive a radio signal from the outside through an antenna port/transceiver. The received radio signal may be converted into a baseband signal through a signal reconstructor. To this end, the signal reconstructor may include a frequency downlink converter, an analog-to-digital converter (ADC), a CP remover, and a fast Fourier transform (FFT) module. Thereafter, the baseband signal may be reconstructed to a codeword through a resource de-mapper process, a postcoding process, a demodulation process, and a de-scramble process. The codeword may be reconstructed to an original information block through decoding. Accordingly, a signal processing circuit (not shown) for a received signal may include a signal reconstructor, a resource de-mapper, a postcoder, a demodulator, a de-scrambler, and a decoder.

Core Implementation Technology of 6G System

Artificial Intelligence (AI)

The most important and newly introduced technology for the 6G system is AI. AI was not involved in the 4G system. 5G systems will support partial or very limited AI. However, the 6G system will support AI for full automation. Advances in machine learning will create more intelligent networks for real-time communication in 6G. Introducing AI in communication may simplify and enhance real-time data transmission. AI may use a number of analytics to determine how complex target tasks are performed. In other words, AI may increase efficiency and reduce processing delay.

Time consuming tasks such as handover, network selection, and resource scheduling may be performed instantly by using AI. AI may also play an important role in machine-to-machine, machine-to-human and human-to-machine communication. In addition, AI may be a rapid communication in a brain computer interface (BCI). AI-based communication systems may be supported by metamaterials, intelligent structures, intelligent networks, intelligent devices, intelligent cognitive radios, self-sustained wireless networks, and machine learning.

Recently, attempts have been made to integrate AI with wireless communication systems, but application layers, network layers, and in particular, deep learning have been focused on the field of wireless resource management and allocation. However, such research is gradually developing into the MAC layer and the physical layer, and in particular, attempts to combine deep learning with wireless transmission are appearing in the physical layer. AI-based physical layer transmission means applying a signal processing and communication mechanism based on an AI driver rather than a traditional communication framework in fundamental signal processing and communication mechanisms. For example, deep learning-based channel coding and decoding, deep learning-based signal estimation and detection, deep learning-based multiple input multiple output (MIMO) mechanism, and AI-based resource scheduling and allocation may be included.

Machine learning may be used for channel estimation and channel tracking, and may be used for power allocation, interference cancellation, and the like in a downlink (DL) physical layer. Machine learning may also be used for antenna selection, power control, symbol detection, and the like in a MIMO system.

However, the application of DNN for transmission in the physical layer may have the following problems.

Deep learning-based AI algorithms require a lot of training data to optimize training parameters. However, due to limitations in obtaining data in a specific channel environment as training data, a lot of training data is used offline. This is because static training on training data in a specific channel environment may cause a contradiction between diversity and dynamic characteristics of a radio channel.

In addition, current deep learning mainly targets real signals. However, the signals of the physical layer of wireless communication are complex signals. In order to match the characteristics of a wireless communication signal, additional research on a neural network that detects a complex domain signal is required.

Hereinafter, machine learning will be described in greater detail.

Machine learning refers to a series of operations for training a machine to create a machine capable of performing a task which can be performed or is difficult to be performed by a person. Machine learning requires data and a learning model. In machine learning, data learning methods may be largely classified into three types: supervised learning, unsupervised learning, and reinforcement learning.

Neural network learning is to minimize errors in output. Neural network learning is a process of updating the weight of each node in the neural network by repeatedly inputting learning data to a neural network, calculating the output of the neural network for the learning data and the error of the target, and backpropagating the error of the neural network from the output layer of the neural network to the input layer in a direction to reduce the error.

Supervised learning uses learning data labeled with correct answers in the learning data, and unsupervised learning may not have correct answers labeled with the learning data. That is, for example, learning data in the case of supervised learning related to data classification may be data in which each learning data is labeled with a category. Labeled learning data is input to the neural network, and an error may be calculated by comparing the output (category) of the neural network and the label of the learning data. The calculated error is backpropagated in a reverse direction (i.e., from the output layer to the input layer) in the neural network, and the connection weight of each node of each layer of the neural network may be updated according to backpropagation. The amount of change in the connection weight of each updated node may be determined according to a learning rate. The neural network's computation of input data and backpropagation of errors may constitute a learning cycle (epoch). The learning rate may be applied differently according to the number of iterations of the learning cycle of the neural network. For example, in the early stages of neural network learning, a high learning rate is used to allow the neural network to quickly achieve a certain level of performance to increase efficiency, and in the late stage of learning, a low learning rate may be used to increase accuracy.

A learning method may vary according to characteristics of data. For example, when the purpose is to accurately predict data transmitted from a transmitter in a communication system by a receiver, it is preferable to perform learning using supervised learning rather than unsupervised learning or reinforcement learning.

The learning model corresponds to the human brain, and although the most basic linear model may be considered, a paradigm of machine learning that uses a neural network structure with high complexity such as artificial neural networks as a learning model is referred to as deep learning.

The neural network cord used in the learning method is largely classified into deep neural networks (DNN), convolutional deep neural networks (CNN), and recurrent Boltzmann machine (RNN), and this learning model may be applied.

Artificial Intelligence System

Figure 8:
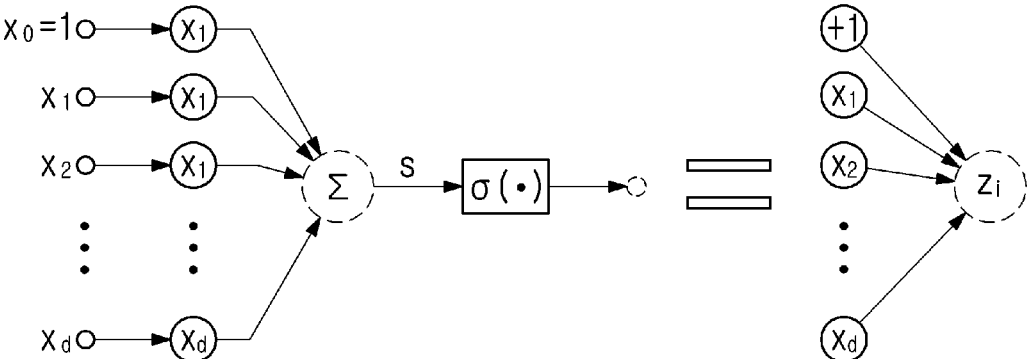
FIG. 8 illustrates a structure of a perceptron included in an artificial neural network applicable to the present disclosure.
Figure 9:
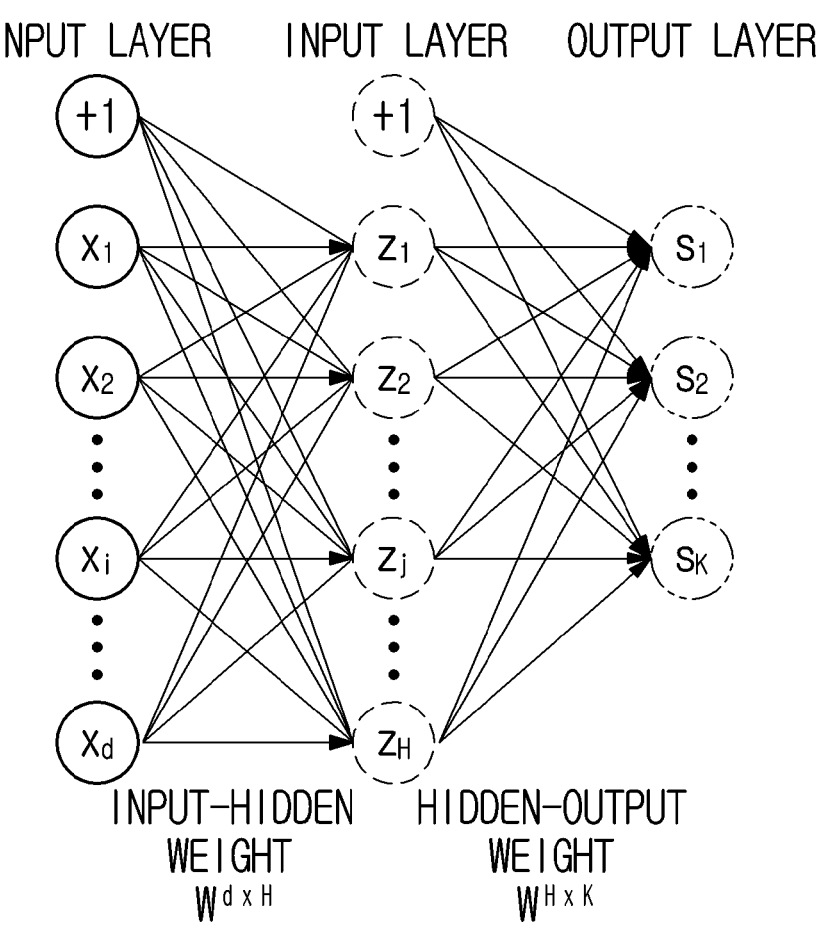
FIG. 9 illustrates an artificial neural network structure applicable to the present disclosure.

FIG. 8 illustrates a structure of a perceptron included in an artificial neural network applicable to the present disclosure. FIG. 9 illustrates an artificial neural network structure applicable to the present disclosure.

As described above, an artificial intelligence system may be applied to a 6G system. Herein, as an example, the artificial intelligence system may operate based on a learning model corresponding to the human brain, as described above. Herein, a paradigm of machine learning, which uses a neural network architecture with high complexity like artificial neural network, may be referred to as deep learning. In addition, neural network cores, which are used as a learning scheme, are mainly a deep neural network (DNN), a convolutional deep neural network (CNN), and a recurrent neural network (RNN). Herein, as an example referring to FIG. 8, an artificial neural network may consist of a plurality of perceptrons. Herein, when an input vector $x=\{x1, x2, \ldots, xd\}$ is input, each component is multiplied by a weight $\{W1, W2, \ldots, Wd\}$, results are all added up, and then an activation function $\sigma(\ )$ is applied, of which the overall process may be referred to as a perceptron. For a large artificial neural network architecture, when expanding the simplified perceptron structure illustrated in FIG. 8, an input may be applied to different multidimensional perceptrons. For convenience of explanation, an input value or an output value will be referred to as a node.

Meanwhile, the perceptron structure illustrated in FIG. 8 may be described to consist of a total of 3 layers based on an input value and an output value. An artificial neural network, which has H (d+1)-dimensional perceptrons between a 1st layer and a 2nd layer and K (H+1)-dimensional perceptrons between the 2nd layer and a 3rd layer, may be expressed as in FIG. 9.

Herein, a layer, in which an input vector is located, is referred to as an input layer, a layer, in which a final output value is located, is referred to as an output layer, and all the layers between the input layer and the output layer are referred to as hidden layers. As an example, 3 layers are disclosed in FIG. 9, but since an input layer is excluding in counting the number of actual artificial neural network layers, it can be understood that the artificial neural network illustrated in FIG. 9 has a total of 2 layers. An artificial neural network is constructed by connecting perceptrons of a basic block two-dimensionally.

The above-described input layer, hidden layer and output layer are commonly applicable not only to multilayer perceptrons but also to various artificial neural network architectures like CNN and RNN, which will be described below. As there are more hidden layers, an artificial neural network becomes deeper, and a machine learning paradigm using a sufficiently deep artificial neural network as a learning model may be referred to as deep learning. In addition, an artificial neural network used for deep learning may be referred to as a deep neural network (DNN).

Figure 10:
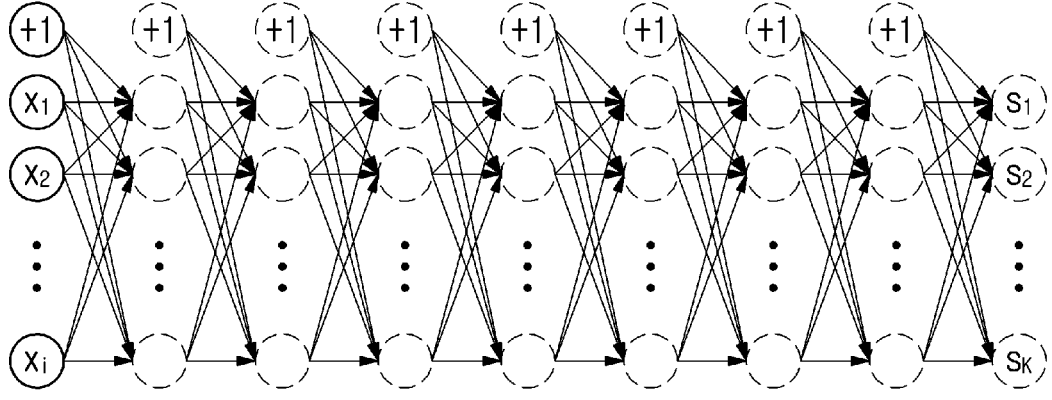
FIG. 10 illustrates a deep neural network applicable to the present disclosure.

FIG. 10 illustrates a deep neural network applicable to the present disclosure.

Referring to FIG. 10, a deep neural network may be a multilayer perceptron consisting of 8 layers (hidden layers+ output layer). Herein, the multilayer perceptron structure may be expressed as a fully-connected neural network. In a fully-connected neural network, there may be no connection between nodes in a same layer and only nodes located in neighboring layers may be connected with each other. A DNN has a fully-connected neural network structure combining a plurality of hidden layers and activation functions so that it may be effectively applied for identifying a correlation characteristic between an input and an output. Herein, the correlation characteristic may mean a joint probability between the input and the output.

Figure 11:
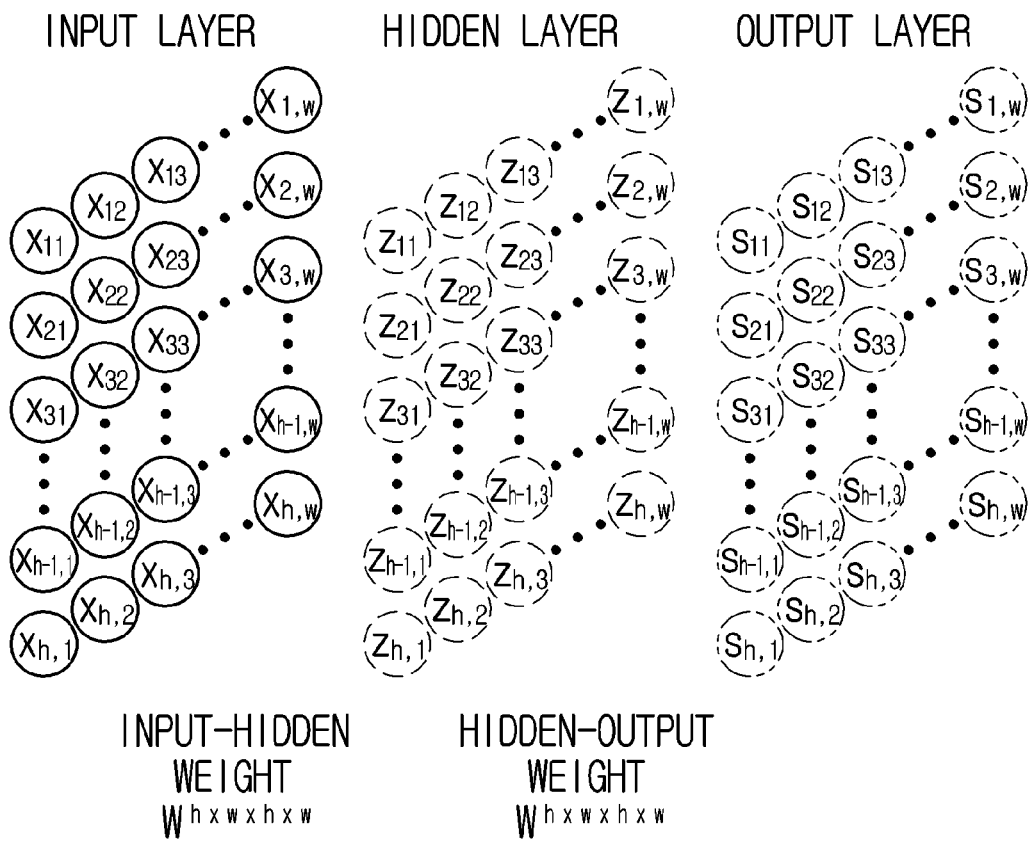
FIG. 11 illustrates a convolutional neural network applicable to the present disclosure.
Figure 12:
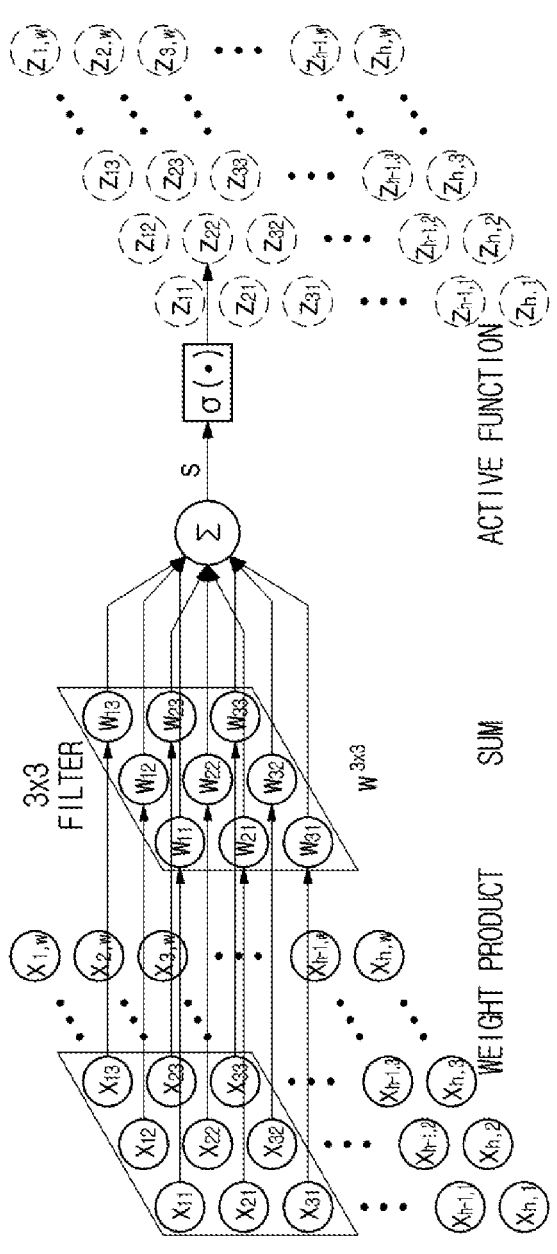
FIG. 12 illustrates a filter operation of a convolutional neural network applicable to the present disclosure.

FIG. 11 illustrates a convolutional neural network applicable to the present disclosure. In addition, FIG. 12 illustrates a filter operation of a convolutional neural network applicable to the present disclosure.

As an example, depending on how to connect a plurality of perceptrons, it is possible to form various artificial neural network structures different from the above-described DNN. Herein, in the DNN, nodes located in a single layer are arranged in a one-dimensional vertical direction. However, referring to FIG. 11, it is possible to assume a two-dimensional array of w horizontal nodes and h vertical nodes (the convolutional neural network structures of FIG. 11). In this case, since a weight is applied to each connection in a process of connecting one input node to a hidden layer, a total of h×w weights should be considered. As there are h×w nodes in an input layer, a total of $h^2w^2$ weights may be needed between two neighboring layers.

Furthermore, as the convolutional neural network of FIG. 11 has the problem of exponential increase in the number of weights according to the number of connections, the presence of a small filter may be assumed instead of considering every mode of connections between neighboring layers. As an example, as shown in FIG. 12, weighted summation and activation function operation may be enabled for a portion overlapped by a filter.

At this time, one filter has a weight corresponding to a number as large as its size, and learning of a weight may be performed to extract and output a specific feature on an image as a factor. In FIG. 12, a 3×3 filter may be applied to a top rightmost 3×3 area of an input layer, and an output value, which is a result of the weighted summation and activation function operation for a corresponding node, may be stored at $z_{22}$.

Herein, as the above-described filter scans the input layer while moving at a predetermined interval horizontally and vertically, a corresponding output value may be put a position of a current filter. Since a computation method is similar to a convolution computation for an image in the field of computer vision, such a structure of deep neural network may be referred to as a convolutional neural network (CNN), and a hidden layer created as a result of convolution computation may be referred to as a convolutional layer. In addition, a neural network with a plurality of convolutional layers may be referred to as a deep convolutional neural network (DCNN).

In addition, at a node in which a current filter is located in a convolutional layer, a weighted sum is calculated by including only a node in an area covered by the filter and thus the number of weights may be reduced. Accordingly, one filter may be so used as to focus on a feature of a local area. Thus, a CNN may be effectively applied to image data processing for which a physical distance in a two-dimensional area is a crucial criterion of determination. Meanwhile, a CNN may apply a plurality of filters immediately before a convolutional layer and create a plurality of output results through a convolution computation of each filter.

Meanwhile, depending on data properties, there may be data of which a sequence feature is important. A recurrent neural network structure may be a structure obtained by applying a scheme, in which elements in a data sequence are input one by one at each timestep by considering the distance variability and order of such sequence datasets and an output vector (hidden vector) output at a specific timestep is input with a very next element in the sequence, to an artificial neural network.

Figure 13:
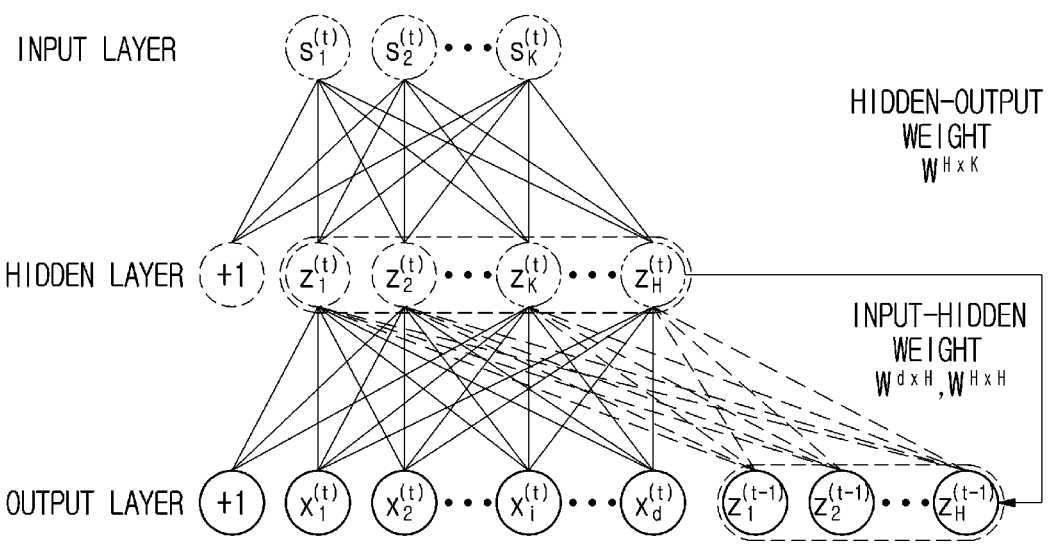
FIG. 13 illustrates a neural network architecture with a recurrent loop applicable to the present disclosure.
Figure 14:
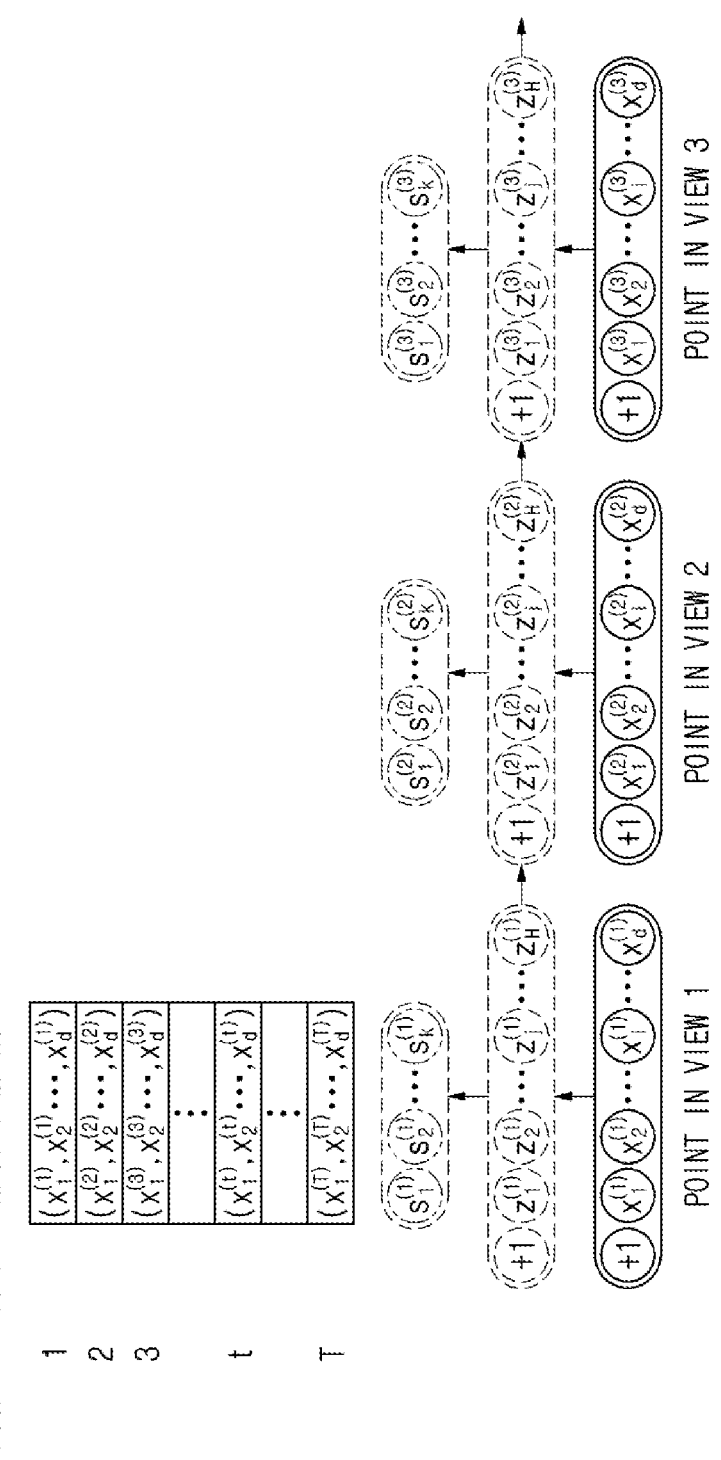
FIG. 14 illustrates an operational structure of a recurrent neural network applicable to the present disclosure.

FIG. 13 illustrates a neural network architecture with a recurrent loop applicable to the present disclosure. FIG. 14 illustrates an operational structure of a recurrent neural network applicable to the present disclosure.

Referring to FIG. 13, a recurrent neural network (RNN) may have a structure which applies a weighted sum and an activation function by inputting hidden vectors $\{z_1^{(t-1)}, z_2^{(t-1)}, \ldots, z_H^{(t-1)}\}$ of an immediately previous timestep t−1 during a process of inputting elements $\{x_1^{(t)}, x_2^{(t)}, \ldots, x_d^{(t)}\}$ of a timestep t in a data sequence into a fully connected neural network. The reason why such hidden vectors are forwarded to a next timestep is because information in input vectors at previous timesteps is considered to have been accumulated in a hidden vector of a current timestep.

In addition, referring to FIG. 14, a recurrent neural network may operate in a predetermined timestep order for an input data sequence. Herein, as a hidden vector $\{z_1^{(1)}, z_2^{(1)}, \ldots, z_H^{(1)}\}$ at a time of inputting an input vector $\{x_1^{(t)}, x_2^{(t)}, \ldots, x_d^{(t)}\}$ of timestep 1 into a recurrent neural network is input together with an input vector $\{x_1^{(2)}, x_2^{(2)}, \ldots, x_d^{(2)}\}$ of timestep 2, a vector $\{z_1^{(2)}, z_2^{(2)}, \ldots, z_H^{(2)}\}$ of a hidden layer is determined through a weighted sum and an activation function. Such a process is iteratively performed at timestep 2, timestep 3 and until timestep T.

Meanwhile, when a plurality of hidden layers are allocated in a recurrent neural network, this is referred to as a deep recurrent neural network (DRNN). A recurrent neural network is so designed as to effectively apply to sequence data (e.g., natural language processing).

Apart from DNN, CNN and RNN, other neural network cores used as a learning scheme include various deep learning techniques like restricted Boltzmann machine (RBM), deep belief networks (DBN) and deep Q-Network, and these may be applied to such areas as computer vision, voice recognition, natural language processing, and voice/signal processing.

Recently, there are attempts to integrate AI with a wireless communication system, but these are concentrated in an application layer and a network layer and, especially in the case of deep learning, in a wireless resource management and allocation filed. Nevertheless, such a study gradually evolves to an MAC layer and a physical layer, and there are attempts to combine deep learning and wireless transmission especially in a physical layer. As for a fundamental signal processing and communication mechanism, AI-based physical layer transmission means application of a signal processing and communication mechanism based on an AI driver, instead of a traditional communication framework. For example, it may include deep learning-based channel coding and decoding, deep learning-based signal estimation and detection, deep learning-based MIMO mechanism, and AI-based resource scheduling and allocation.

Specific Embodiment of the Disclosure

The present disclosure proposes a method of mitigating signal loss based on transmission power limitation of terminals to which analog or digital air-computation is applied. Specifically, when a terminal transmits a signal using a pre-equalizer method based on channel inversion in the AirComp technique, transmission power enhancement may occur according to channel inversion. Therefore, when the terminal transmits a signal using the pre-equalizer method, the transmission power limitation problem may be intensified. Deep fading may occur when channel inversion is applied. In this case, the transmission power of the corresponding resource may greatly increase. Therefore, when a terminal transmits a signal using a channel inversion method, signal loss due to transmission power limitation may occur and power may increase. Accordingly, the present disclosure proposes a method for a terminal to reduce average transmission power by selectively applying a frequency selection transmission scheme and a frequency combining transmission scheme of AirComp transmission.

Figure 15:
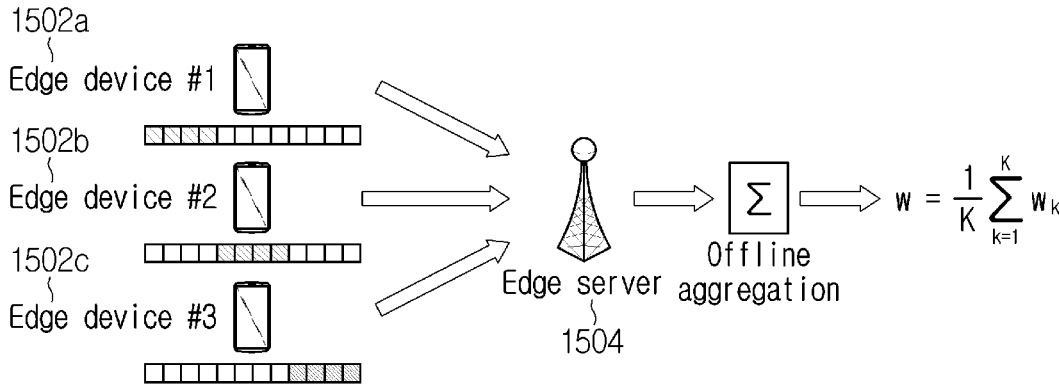
FIG. 15 is a diagram illustrating an example of federated learning applicable to the present disclosure.

FIG. 15 is a diagram illustrating an example of federated learning applicable to the present disclosure. Federated learning is one of the distributed machine learning techniques. Federated learning is a technique in which several devices, which are subjects of learning, share parameters with a server. For example, in federated learning, multiple devices that are subjects of learning share a weight or gradient of a local model with the server. The server collects the local model parameters of each device and updates a global parameter. The server does not share raw data of the devices with devices. Accordingly, federated learning may reduce communication overhead in a data transmission process and protect personal information.

Federated learning based on orthogonal multiple access operates as shown in FIG. 15. Devices 1502a, 1502b, and 1502c transmit local parameters in their respective assigned resources. A server 1504 performs offline aggregation on the parameters received from the devices. In general, the server derives a global parameter through averaging of all local parameters. Then, the server transmits the derived global parameter to the devices again. However, as the number of devices participating in learning increases under limited radio resources, the time for the server to update the global parameter is delayed. To solve these problems, research on air computation (AirComp)-based federated learning is being conducted. AirComp-based federated learning will be described with reference to FIG. 16 below. In the present disclosure, the server may refer to a base station and may perform federated learning with multiple user equipments. Also, a user equipment may be referred to as a user.

Figure 16:
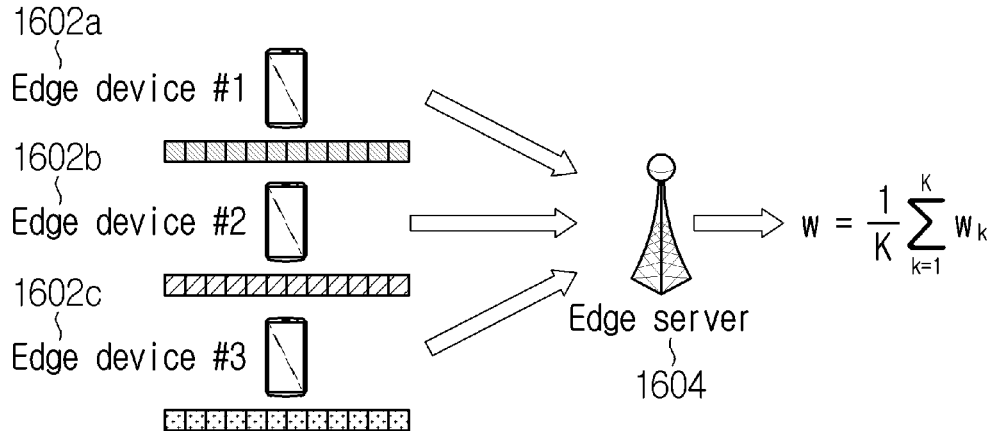
FIG. 16 illustrates an example of federated learning applicable to the present disclosure.
Figure 17:
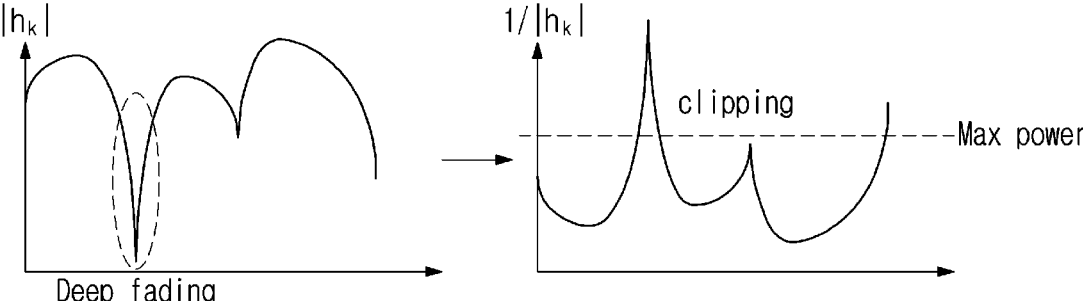
FIG. 17 illustrates an example in which a user equipment (UE) transmits a signal using channel inversion.

FIG. 16 illustrates an example of federated learning applicable to the present disclosure, and FIG. 17 illustrates an example in which a UE transmits a signal using channel inversion.

Referring to FIG. 16, AirComp-based federated learning is a method in which all devices 1602a, 1602b, and 1602c transmit local parameters to a server 1604 using the same resource. The server may obtain a sum of the local parameters by superposition characteristics of analog waveforms of the received signals. Since, in AirComp-based federated learning, local parameters are transmitted through the same resource, the number of devices participating in learning does not significantly affect latency. However, in a situation where the transmission power which may be transmitted by each device is limited, a problem in which the range of signals that may be transmitted by the device is limited according to the channel power and the gradient value obtained by learning of the device may occur. Accordingly, a transmitted signal may be lost and performance degradation may occur.

In the present disclosure, a regular character may represent a scalar. Bold lowercase and uppercase characters may represent a vector and a matrix, respectively. Calligraphic character may mean a set. For example, x, x, X and $\mathcal{X}$ may mean scalar, vector, matrix and set, respectively. x[i] may mean an i-th entry of a vector x.

$$[x[i]]_{i=m}^{n}$$

may represent [x[m], x[m+1], . . . , x[n]]. |x| and |x| may represent an absolute value of x and a cardinality of x, respectively. $(x)_+$ may represent $$[\max (x_i, 0)]_{i=1}^{|x|}.$$

real(x) and imag(x) may represent a real and imaginary parts of x, respectively.

The left side of FIG. 17 illustrates a case where deep fading occurs when channel inversion is applied. In this case, referring to the right side of FIG. 17, transmission power of a corresponding resource may greatly increase. Therefore, when a UE transmits a signal using a channel inversion method, signal loss due to transmission power limitation may occur and power may increase. Accordingly, the present disclosure proposes a method for a UE to reduce average transmission power by selectively applying a frequency selection transmission scheme and a frequency combining transmission scheme of AirComp transmission.

Figure 18:
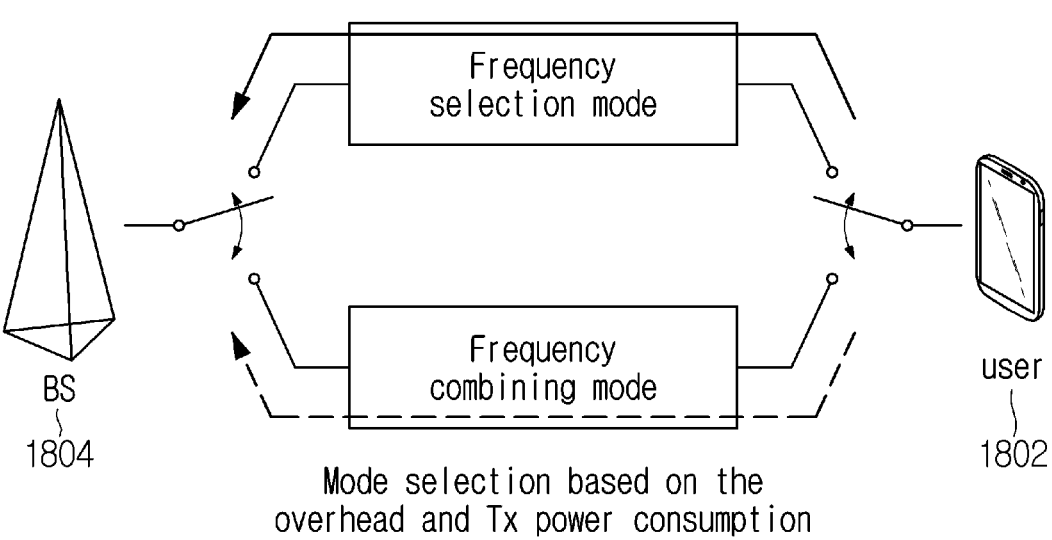
FIG. 18 illustrates an example of a transmission method selection operation applicable to the present disclosure.

FIG. 18 illustrates an example of a transmission method selection operation applicable to the present disclosure. Referring to FIG. 18, a user equipment (UE) 1802 may transmit a signal to a base station 1804 based on AirComp. At this time, the UE may transmit a signal to the base station by selectively applying a frequency selection mode or a frequency combining mode. Accordingly, average transmission power of the signal transmitted by the UE may decrease. The frequency selection mode and the frequency combining mode will be described in detail with reference to FIGS. 19 and 20 below.

Figure 19:
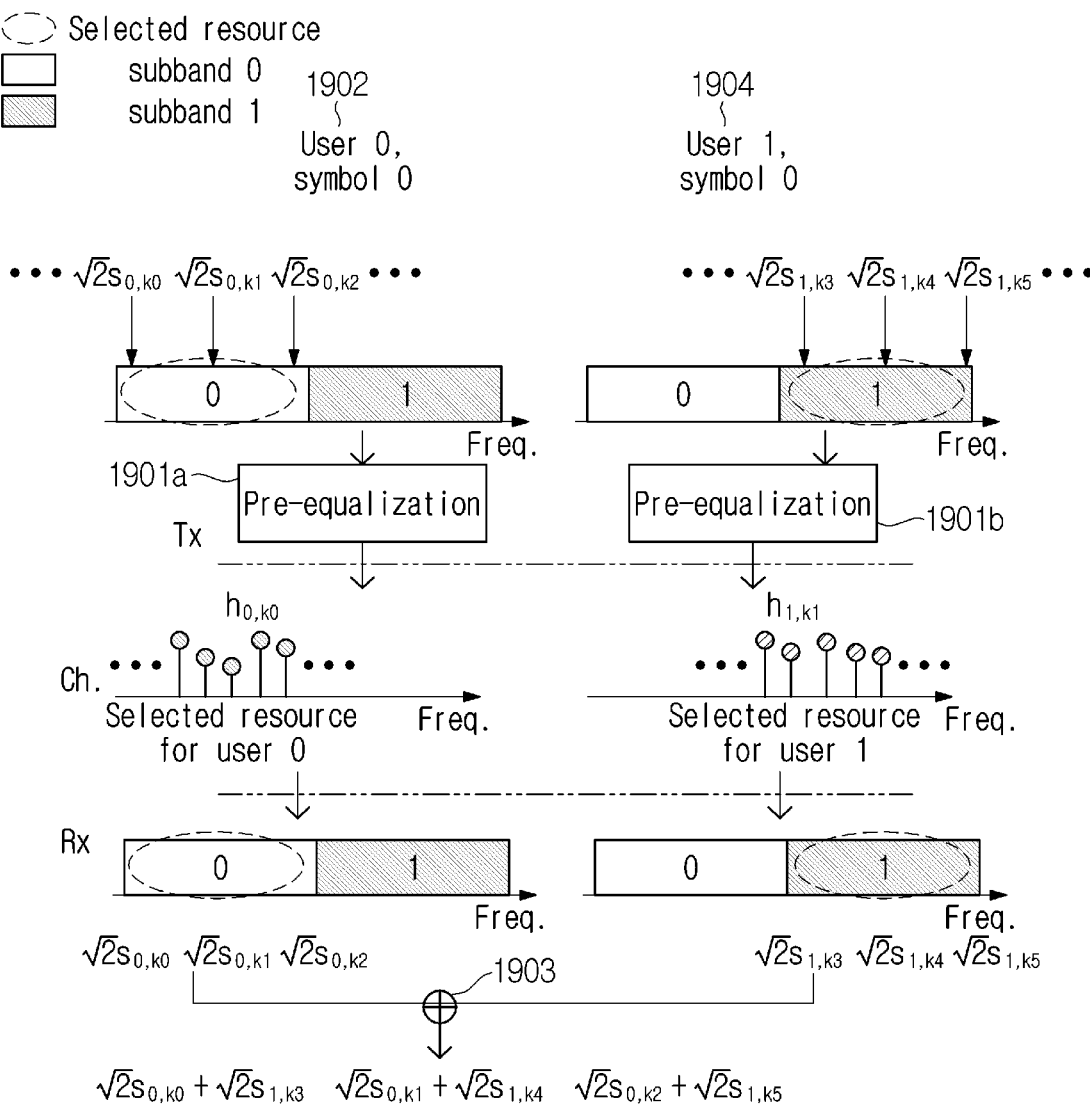
FIG. 19 illustrates an example of a signal transmission mode applicable to the present disclosure.

FIG. 19 illustrates an example of a signal transmission mode applicable to the present disclosure. Transmission modes include Mode 1 and Mode 2. Mode 1 may be referred to as a frequency selection mode. Mode 2 may be referred to as a frequency combining mode. The frequency selection mode (Mode 1) will be described below. In FIG. 19, a situation in which a base station receives signals from two user equipments (UEs) 1902 and 1904 is assumed. In the present disclosure, the user equipment (UE) may be expressed interchangeably with a user.

In the frequency selection mode, the base station may divide all resources into two subbands by applying a predetermined method. In addition, the base station may inform the two UEs of which resources are used to transmit the signals with respect to the divided two subbands. That is, the base station may determine that UE 0 1902 transmits a signal in Symbol 0 and Subband 0, and UE 1 1904 transmits a signal in Symbol 0 and Subband 1. In addition, the base station may inform UE 0 and UE 1 of resources allocated to UE 0 and UE 1, respectively.

In addition, the base station may inform each UE of which resource is used to transmit a signal to each UE based on the estimated power of the uplink channel. That is, the base station may inform each UE of the resource through which each UE transmits the signal $s_{i,k}$ based on the uplink channel power. Here, i is a UE index. k is a subcarrier index. Referring to FIG. 19, each signal $s_{i,k}$ has a root 2 as a coefficient. Here, the coefficient is determined based on the number of subbands. Specifically, when the number of subbands is N, the coefficient becomes a root N. For example, when the number of subbands is 4, the coefficient becomes a root 4 (=2).

Each UE may transmit a signal through an allocated resource. That is, UE 0 1902 may transmit a signal in Symbol 0 and Subband 0, and UE 1 1904 may transmit a signal in Symbol 0 and Subband 1. Each of the UEs 1902 and 1904 may transmit signals based on a channel inversion type pre-equalizer (1901a, 1901b). A base station may receive a signal from each UE. The base station may receive a signal from UE 0 1902 in Symbol 0 and Subband 0, and may receive a signal from UE 1 1904 in Symbol 0 and Subband 1. The base station may combine the signals received from respective UEs (1903). The base station may estimate an aggregated gradient by combining the received signals.

The base station may set a subband based on channel power or power of the inverse of a channel. Accordingly, transmission power of UEs may decrease. In addition, the base station informs a plurality of UEs of the subband, the plurality of UEs may transmit signals based on allocated resources, and the number of UEs to which the subband is allocated in the signal transmission method according to the frequency selection mode is not limited to the above-described embodiment.

Figure 20:
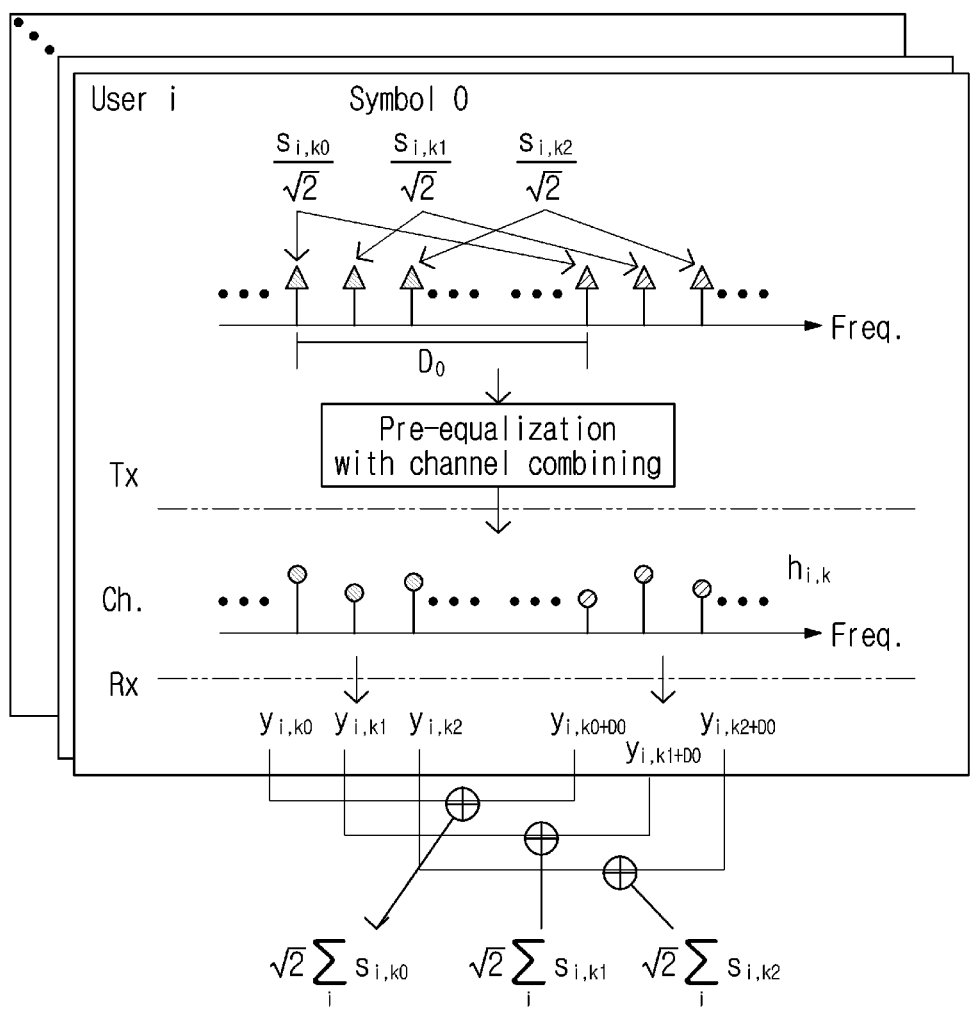
FIG. 20 illustrates an example of a signal transmission mode applicable to the present disclosure.

FIG. 20 illustrates an example of a signal transmission mode applicable to the present disclosure. Transmission modes include Mode 1 and Mode 2. Mode 1 may be referred to as a frequency selection mode. Mode 2 may be referred to as a frequency combining mode. The frequency combining mode will be described below. In FIG. 20, it is assumed that a UE transmits the same gradient through two subcarriers. Here, the two subcarriers may experience different channels. In addition, the UE transmits the gradient by applying a channel inversion pre-equalizer. The base station may combine signals including subcarriers transmitting the same gradient. The base station may estimate an aggregated gradient by combining the received signals.

Referring to 20, D0 is N/2. For example, when N=1024, D0=512. Here, N is a fast Fourier transformation (FFT) size. D0 is an interval between subcarriers transmitting the same $s_{i,k}$. D0 may be determined based on the FFT size, and is not limited to the embodiment of the present disclosure. $s_{i,k}$ is $(\nabla_{i,m_1} + j\nabla_{i,m_2})/\sqrt{2}$. k is a subcarrier index. i is a UE index. m is an element index of a gradient. In FIG. 20, $s_{i,k}$ has a root 2 as a denominator. This is because the UE transmits the same gradient through two subcarriers. When the UE transmits the same gradient through n subcarriers, it may have a root n as a denominator, and the number of subcarriers transmitting the same gradient is not limited to the embodiment of the present disclosure. The average powers of $s_{i,k}$ and $\nabla_{i,m_1}$ are both 1.

In FIG. 20, a transmitter may transmit $s_{i,k}$ through two subcarriers (2002a, 2002b, 2002c). A receiver may combine signals received through subcarriers having the same $s_{i,k}$ (2004a, 2004b, 2004c). At this time, D0 may be set to N/2, which is the largest value when considering the FFT size. In FIG. 20, the UE may reduce transmission power based on the combining gain of signals transmitted through two subcarriers.

Hereinafter, transmission power and overhead in frequency selection mode and frequency combining mode will be described. Table 1 is a table comparing transmission power and overhead in frequency selection mode and frequency combining mode.

TABLE 1

|  | Mode 1 (Channel selection) | Mode 2 (Channel combining) |
|---|---|---|
| Tx Power | $P_1 = \{2/|H_{i,selected\ k}|^2\}$ | $P_2 = 2/(|H_{i,k0}|^2 + |H_{i,k1}|^2)$ |
| Overhead | Channel estimation coefficient (U × N/2 × L bits) + resource selection (U × N/G/2 bits) + mode selection (1 bit) L: bit resolution of the Ch. Est. coefficient N: FFT size U: the number of users * G: the number of subcarriers in a subband | Channel estimation coefficient (U × N × L bits) + mode selection (1 bit) |

When the base station estimates the aggregated gradient in the frequency combining mode (Mode 2), the signals including the same gradient transmitted through a plurality of subcarriers may be received and combined. In contrast, in the frequency selection mode (Mode 1), the UE may transmit the gradient to the base station through some of all resources. When estimating the aggregated gradient, the base station may add the received subcarrier and a signal in which only noise is present. Accordingly, when the frequency combining mode and the frequency selection mode show the same performance, the frequency combining mode may have less transmission power than the frequency selection mode due to the combining gain of the frequency combining mode.

From the point of view of uplink channel estimation feedback overhead for the pre-equalizer, in case of frequency combining mode, the UE requires uplink estimation results for all subcarriers. Therefore, the base station feeds back the uplink estimation results for all estimated subcarriers to each UE. In contrast, in the frequency selection mode, since the UE transmits a gradient through some of all subcarriers, the number of subcarriers to be pre-equalized may be reduced compared to the frequency combining mode. As described above in FIG. 19, when a resource is divided into two subbands, since the UE transmits a gradient through subcarriers corresponding to half of all subcarriers, the number of subcarriers to be pre-equalized may be reduced compared to the frequency combining mode. Therefore, the overhead of the feedback for the uplink channel estimation result estimated by the base station is less in the frequency selection mode than in the frequency combining mode. Table 1 contains details of other control information and overhead.

Table 2 below shows a transmitted signal, a received signal, and transmission power in each mode when the number of UEs is 2.

Hereinafter, a transmission mode selection procedure will be described. A base station estimates an uplink channel. In addition, the base station transmits control information related to transmission mode selection to a UE. In addition, the base station transmits the feedback of the uplink channel estimation result to the UE. The UE may transmit a signal to the base station according to the selected mode.

Figure 21:
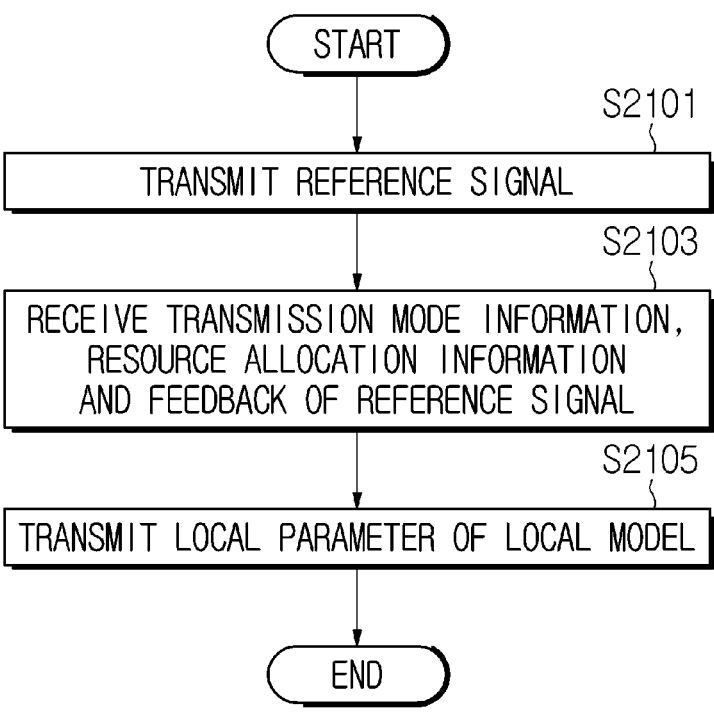
FIG. 21 illustrates an operation procedure of a UE applicable to the present disclosure.

FIG. 21 illustrates an operation procedure of a UE applicable to the present disclosure. In step S2101, the UE may transmit a reference signal. Specifically, the UE may transmit a reference signal for uplink channel estimation to the base station. For example, the UE may transmit a sounding reference signal (SRS) to the base station.

In step S2103, the UE may receive a response message based on the reference signal from the base station. The response message may include transmission mode informa-

TABLE 2

| | Tx signal | | Rx signal (w: Rx noise) | Tx Power |
|---|---|---|---|---|
| Mode 1: channel selection | User 0: $\left(\dfrac{\sqrt{2}\,s_{0,k0}}{H_{0,k0}}, 0\right)$, if $|H_{0,k0}| > |H_{0,k1}|$ | | $\sqrt{2}(s_{0,k0} + s_{1,k1}) + w_{k0} + w_{k1}$ | $P_1 = \{2/|H_{i,selected\ k}|^2\}$ |
| | User 1: $\left(0, \dfrac{\sqrt{2}\,s_{1,k1}}{H_{1,k1}}\right)$, if $|H_{1,k0}| < |H_{1,k1}|$ | | | |
| | $\left(s_{0,k0} = (\nabla_{0,m1} + j\nabla_{0,m2})/\sqrt{2}\right)$ | | | |
| | $\left(s_{1,k1} = (\nabla_{1,m1} + j\nabla_{1,m2})/\sqrt{2}\right)$ | | | |
| Mode 2: channel combining | User 0: $\left(\dfrac{\sqrt{2}\,(H_{0,k0})*s_{0,k0}}{|H_{0,k0}|^2 + |H_{0,k0+D0}|^2}, \dfrac{\sqrt{2}\,(H_{0,k0+D0})*s_{0,k0}}{|H_{0,k0}|^2 + |H_{0,k0+D0}|^2}\right)$ | | $\sqrt{2}(s_{0,k0} + s_{1,k0}) + w_{k0} + w_{k1}$ | $P_2 = E\{2/(|H_{i,k0}|^2 + |H_{i,k1}|^2)\}$ |
| | User 1: $\left(\dfrac{\sqrt{2}\,(H_{1,k0})*s_{1,k0}}{|H_{1,k0}|^2 + |H_{1,k0+D0}|^2}, \dfrac{\sqrt{2}\,(H_{1,k0+D0})*s_{1,k0}}{|H_{1,k0}|^2 + |H_{1,k0+D0}|^2}\right)$ | | | |

In Table 2, the transmission power represents transmission power in a scaled state so that the performance of the received signal is the same.

Table 3 below shows the amount of overhead when the number of UEs is 100 and the total number of subcarriers is 1024.

TABLE 3

| | Mode 1 (Channel selection) | Mode 2 (Channel combining) |
|---|---|---|
| Overhead | Ch. Est. coefficient (U × N/2 × L bits) + resource selection (U × N/G/2 bits) + mode selection (1 bit) * G: the number of subcarriers in a subband | Ch. Est. coefficient (U × N × L bits) + mode selection (1 bit) |
| Overhead L = 16, G = 512 | 819200 + 100 + 1 = 819301 bits | 1638400 + 1 = 1638401 bits |
| Overhead L = 16, G = 16 | 819200 + 3200 + 1 = 822401 bits | 1638400 + 1 = 1638401 bits |

From Table 3, it can be seen that the overhead of Mode 1 is about half that of Mode 2. As described above, the base station may select Mode 2 to maximize the transmitted signal power reduction effect. In addition, the base station may select Mode 1 in order to reduce a transmission signal power reduction effect as well as channel feedback overhead.

tion, resource allocation information, and feedback of the reference signal. Specifically, the base station may estimate an uplink channel based on the reference signal transmitted by the UE. The base station may feed back the uplink channel estimation result to the UE. In addition, the base station may transmit transmission mode information and resource allocation information to the UE. Here, the transmission mode information includes a first transmission mode and a second transmission mode. The first transmission mode means the above-mentioned frequency selection mode, and the second transmission mode means the above-mentioned frequency combining mode.

In step S2105, the UE transmits the local parameter of the local model. The local parameter of the local model is transmitted based on the first transmission mode or the second transmission mode. In addition, the local parameter of the local model is related to federated learning. Specifically, the local parameter of the local model includes a weight or gradient of the local model related to federated learning described above in the present disclosure. In addition, the UE may transmit the local parameter of the local model using the same resource as other UEs participating in federated learning. That is, the UE may perform the above-described air-computation federated learning. The local parameter of the local model may be transmitted based on pre-equalization using channel inversion.

When the UE transmits the local parameter of the local model based on the first transmission mode, the UE may transmit the local parameter of the local model based on the resource allocation information. When the UE transmits the local parameter of the local model based on the second transmission mode, the local parameter of the local model may be transmitted using a plurality of subcarriers.

After receiving the parameters of local models from a plurality of UEs, the base station may update the parameter of a global model. The base station may transmit the updated global parameter to the UEs. The UE may receive the global parameter and repeat the above-described procedures. However, a certain procedure may be omitted, and all procedures do not have to be repeated.

Figure 22:
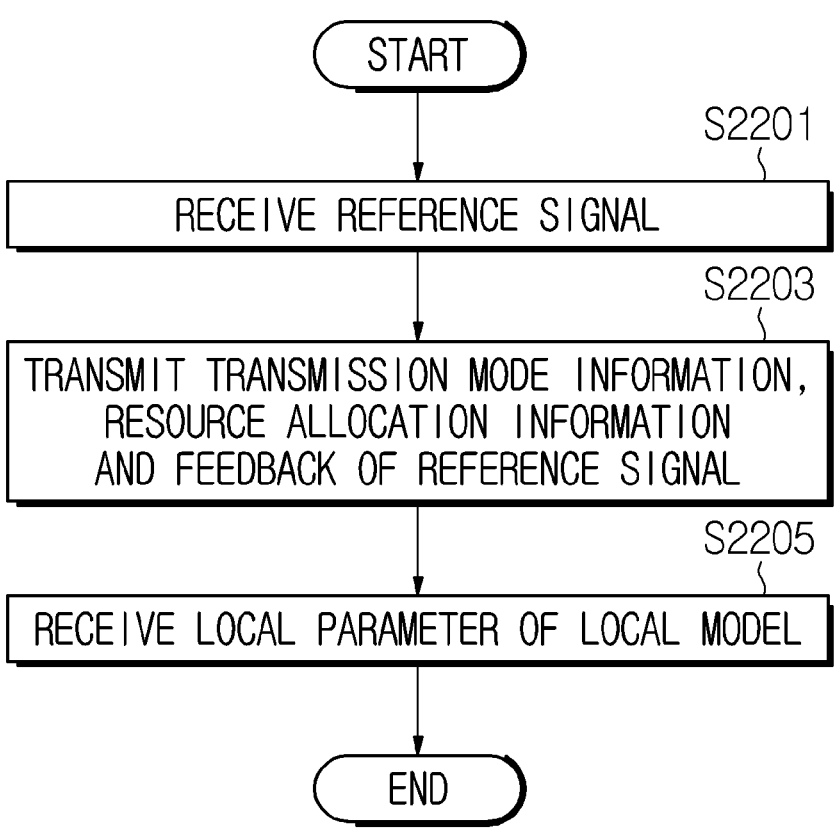
FIG. 22 illustrates an operation procedure of a base station applicable to the present disclosure.

FIG. 22 illustrates an operation procedure of a base station applicable to the present disclosure. In step S2201, a base station receives a reference signal. Specifically, the base station may receive a reference signal for uplink channel estimation from a UE. For example, the base station may receive an SRS from the UE. The base station may estimate an uplink channel based on the received reference signal.

In step S2203, the base station may transmit a response message to the UE based on the reference signal. The response message may include transmission mode information, resource allocation information, and feedback information of the reference signal. That is, the base station may feed back an uplink channel estimation result to the UE. In addition, the base station may transmit transmission mode information and resource allocation information to the UE. Here, the transmission mode information includes a first transmission mode and a second transmission mode. The first transmission mode means the above-mentioned frequency selection mode (Mode 1), and the second transmission mode means the above-mentioned frequency combining mode (Mode 2). The base station may select the first transmission mode in order to reduce channel feedback overhead along with a transmission signal power reduction effect. The base station may select the second transmission mode in order to maximize the transmission signal power reduction effect. The base station may indicate the first transmission mode to some of the UEs in the cell, and may indicate the second transmission mode to some other terminals. That is, the base station may determine a UE group performing federated learning based on the first transmission mode and a UE group performing federated learning based on the second transmission mode.

In step S2205, the base station receives a local parameter of a local model from the UE. The local parameter of the local model is transmitted based on the first transmission mode or the second transmission mode. In addition, the local parameter of the local model is related to federated learning. Specifically, the local parameter of the local model includes a weight or gradient of the local model related to federated learning described above in the present disclosure. In addition, the above-described federated learning may be based on air-computation. The local parameter of the local model may be transmitted based on pre-equalization using channel inversion.

After receiving the parameters of local models from a plurality of UEs, the base station may update the parameter of a global model. The base station may transmit the updated global parameter to the UEs. The UE may receive the global parameter and repeat the above-described procedures. However, a certain procedure may be omitted, and all procedures do not have to be repeated.

Figure 23A:
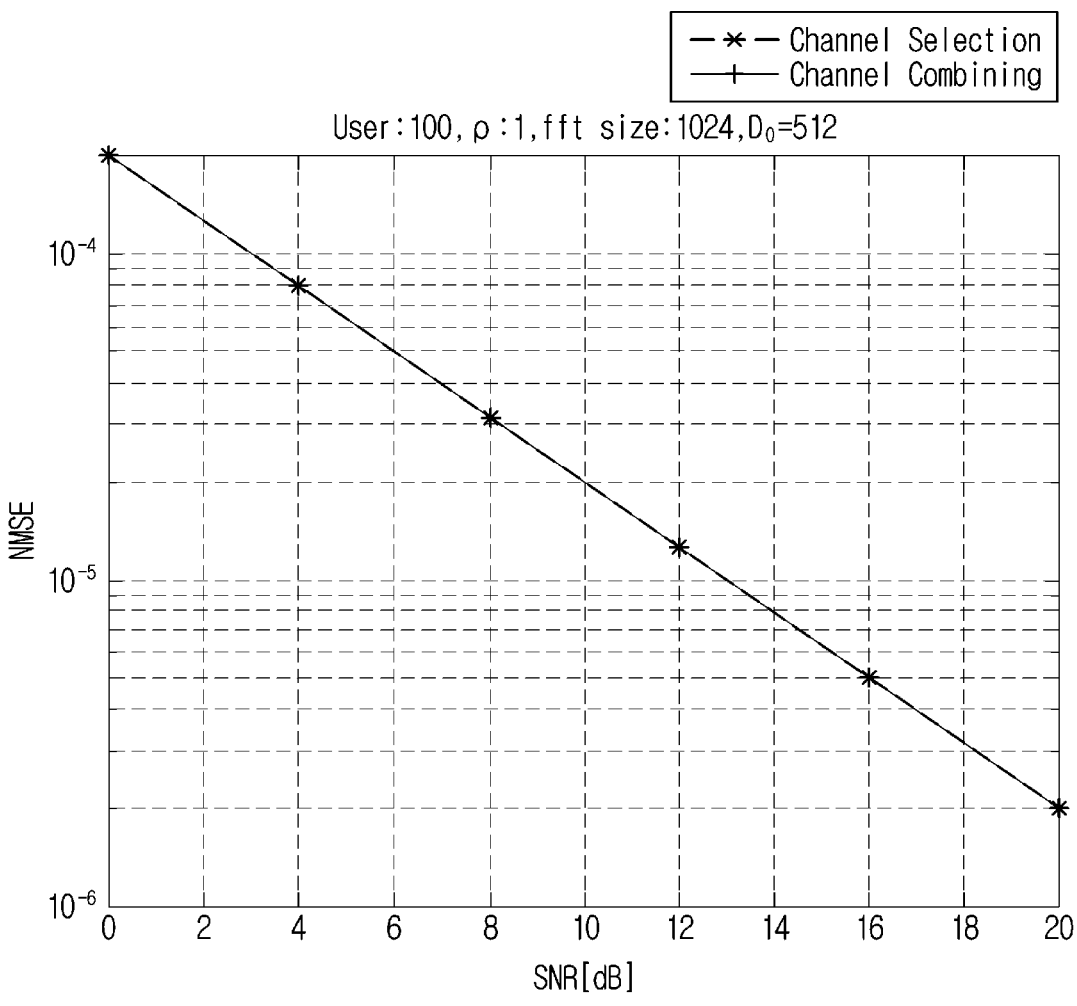
FIG. 23A illustrates simulation results according to the present disclosure.
Figure 23B:
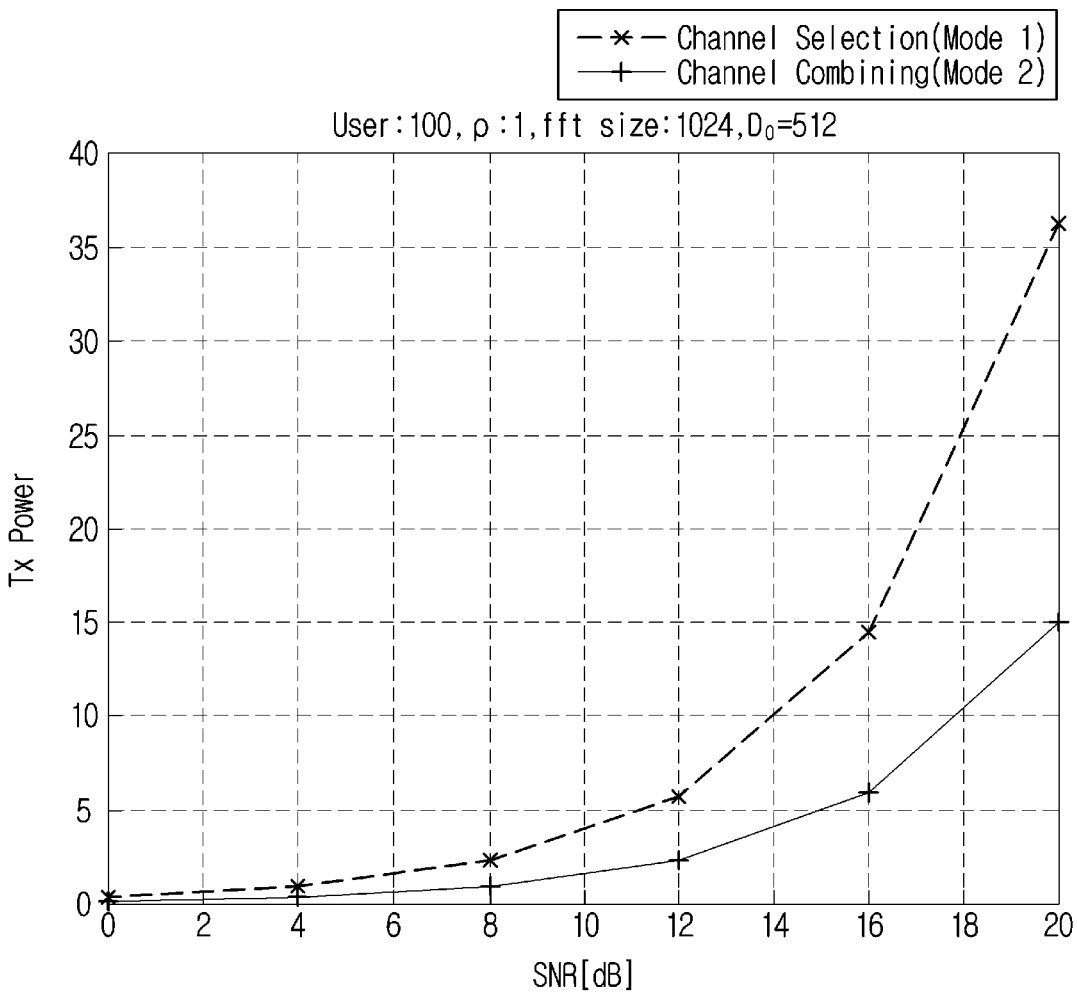
FIG. 23B illustrates simulation results according to the present disclosure.
Figure 23C:
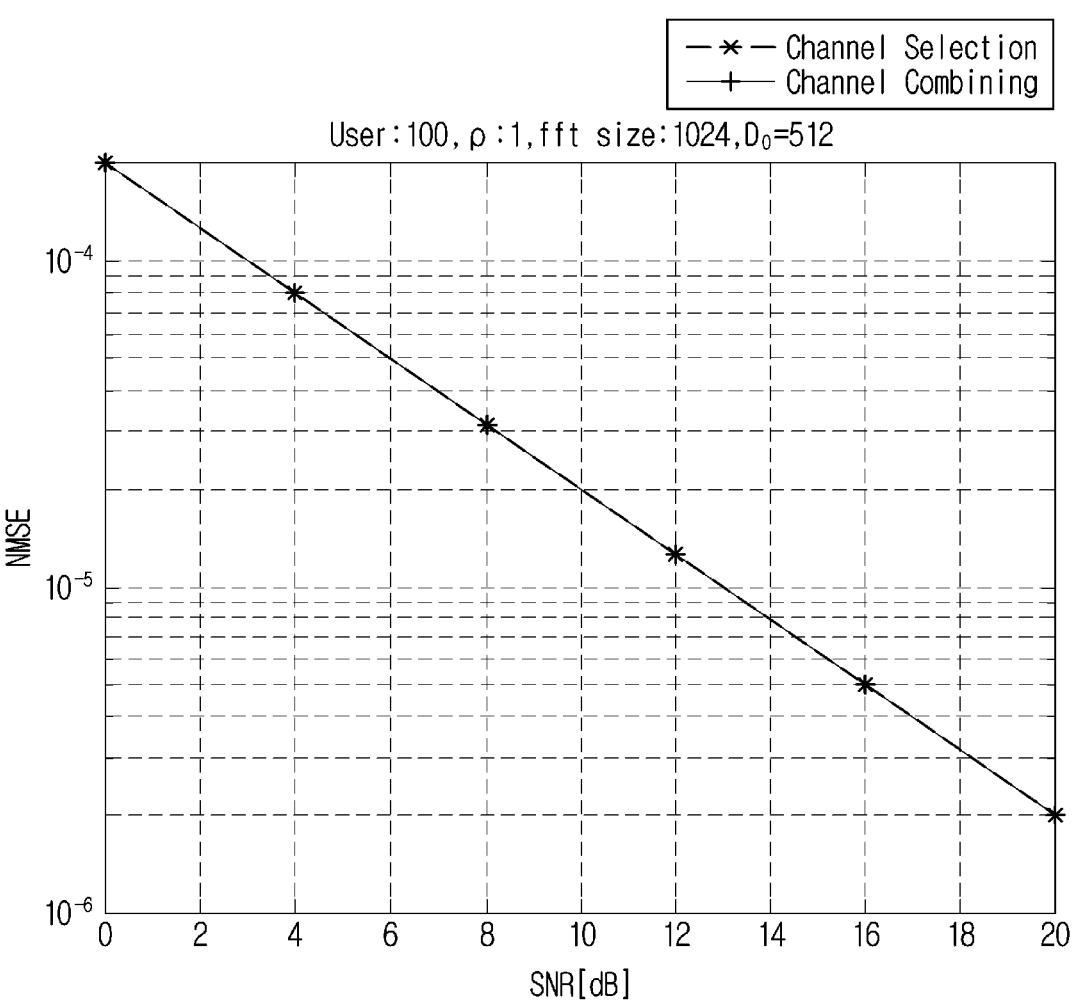
FIG. 23C illustrates simulation results according to the present disclosure.
Figure 23D:
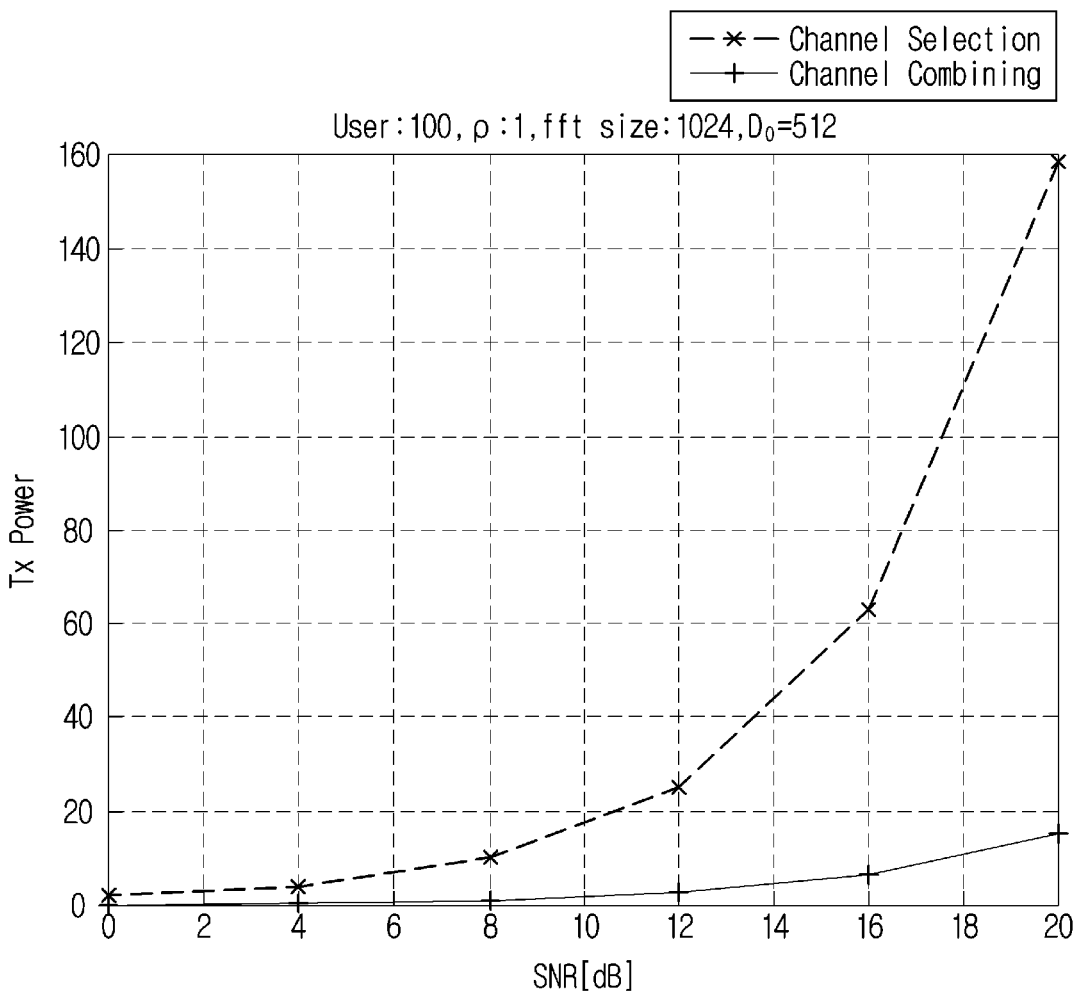
FIG. 23D illustrates simulation results according to the present disclosure.

FIG. 23A-23D illustrate simulation results according to the present disclosure. FIGS. 23A and 23B illustrate simulation results when N=1024, D0=512, and G=16. FIGS. 23C and 23D illustrate simulation results when N=1024, D0=512, and G=512. FIGS. 23B and 23D illustrate a difference in transmission (Tx) power in a situation in which performance of Mode 1 and mode 2 are equal. The drawings considered a channel environment with a length of 64 samples. G is a subband size (the number of subcarriers) of Mode 1, N is the total number of subcarriers, and D0 is an interval between subcarriers selected to transmit the same signal in Mode 2. FIGS. 23A to 23D, it can be seen that Mode 2 uses less transmission power than Mode 1.

Examples of the above-described proposed methods may be included as one of the implementation methods of the present disclosure and thus may be regarded as kinds of proposed methods. In addition, the above-described proposed methods may be independently implemented or some of the proposed methods may be combined (or merged). The rule may be defined such that the base station informs the UE of information on whether to apply the proposed methods (or information on the rules of the proposed methods) through a predefined signal (e.g., a physical layer signal or a higher layer signal).

Examples of the above-described proposed methods may be included as one of the implementation methods of the present disclosure and thus may be regarded as kinds of proposed methods. In addition, the above-described proposed methods may be independently implemented or some of the proposed methods may be combined (or merged). The rule may be defined such that the base station informs the UE of information on whether to apply the proposed methods (or information on the rules of the proposed methods) through a predefined signal (e.g., a physical layer signal or a higher layer signal).

Those skilled in the art will appreciate that the present disclosure may be carried out in other specific ways than those set forth herein without departing from the spirit and essential characteristics of the present disclosure. The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. Moreover, it will be apparent that some claims referring to specific claims may be combined with another claims referring to the other claims other than the specific claims to constitute the embodiment or add new claims by means of amendment after the application is filed.

What is claimed is:

1. A method of operating a user equipment (UE) in a wireless communication system, the method comprising:
   receiving resource information related to a reference signal;
   transmitting the reference signal based on the received resource information to a base station by the UE;
   receiving a message comprising resource allocation information from the base station based on the reference signal by the UE; and
   transmitting uplink data to the base station by the UE,
   wherein the uplink data comprises a local parameter of a local model,
   wherein the message comprises transmission mode information and feedback information of the reference signal,
   wherein the transmission mode information indicates a first transmission mode or a second transmission mode, the local parameter of the local model is transmitted based on the indicated first transmission mode or second transmission mode, and the local parameter of the local model is related to federated learning, wherein the first transmission mode indicates the local parameter is transmitted based on a first sub-band which is used exclusively by the UE, and wherein the second transmission mode indicates the local parameter is transmitted based on subcarriers which are located at equal intervals in the frequency domain.

2. The method of claim 1, wherein the local parameter of the local model is transmitted based on the resource allocation information based on that the local parameter of the local model being transmitted on the first transmission mode.

3. The method of claim 1, wherein the local parameter of the local model is transmitted using a plurality of subcarriers based on that the local parameter of the local model being transmitted on the second transmission mode.

4. The method of claim 2, wherein UEs participating in the federated learning use the same resource.

5. The method of claim 4, wherein the resource allocation information comprises frequency information allocated to each of the UEs participating in the federated learning.

6. The method of claim 1, wherein the reference signal is a sounding reference signal (SRS).

7. The method of claim 1, wherein the local parameter of the local model is transmitted based on a pre-equalizer using channel inversion.

8. A user equipment (UE) in a wireless communication system, comprising:

a transceiver; and a processor connected to the transceiver, wherein the processor is configured to control the transceiver to:

receive resource information related to a reference signal;

transmit the reference signal based on the received resource information to a base station;

receive a message comprising resource allocation information from the base station based on the reference signal; and transmit uplink data to the base station, wherein the uplink data comprises a local parameter of a local model, wherein the message comprises transmission mode information and feedback information of the reference signal, the transmission mode information indicates a first transmission mode or a second transmission mode, the local parameter of the local model is transmitted based on the indicated first transmission mode or second transmission mode, and the local parameter of the local model is related to federated learning, wherein the first transmission mode indicates the local parameter is transmitted based on a first sub-band which is used exclusively by the UE, and wherein the second transmission mode indicates the local parameter is transmitted based on subcarriers which are located at equal intervals in the frequency domain.

9. The UE of claim 8, wherein the local parameter of the local model is transmitted based on the resource allocation information based on that the local parameter of the local model being transmitted on the first transmission mode.

10. The UE of claim 8, wherein the local parameter of the local model is transmitted using a plurality of subcarriers based on that the local parameter of the local model being transmitted on the second transmission mode.

11. The UE of claim 9, wherein UEs participating in the federated learning use the same resource.

12. The UE of claim 11, wherein the resource allocation information comprises frequency information allocated to each of the UEs participating in the federated learning.

13. The UE of claim 8, wherein the reference signal is a sounding reference signal (SRS).

14. The UE of claim 8, wherein the local parameter of the local model is transmitted based on a pre-equalizer using channel inversion.

15. A base station in a wireless communication system, comprising:

a transceiver; and a processor connected to the transceiver, wherein the processor is configured to control the transceiver to:

transmit resource information related to a reference signal;

receive the reference signal based on the received resource information from a user equipment (UE);

transmit a message comprising resource allocation information to the UE based on the reference signal; and receive uplink data from the UE, wherein the uplink data comprises a local parameter of a local model, wherein the message comprises transmission mode information and feedback information of the reference signal, the transmission mode information indicates a first transmission mode or a second transmission mode, the local parameter of the local model is transmitted based on the indicated first transmission mode or second transmission mode, and the local parameter of the local model is related to federated learning, wherein the first transmission mode indicates the local parameter is transmitted based on a first sub-band which is used exclusively by the UE, and wherein the second transmission mode indicates the local parameter is transmitted based on subcarriers which are located at equal intervals in the frequency domain.

* * * * *